United States Patent
Gaurav et al.

(10) Patent No.: US 9,953,276 B2
(45) Date of Patent: Apr. 24, 2018

(54) METHOD AND SYSTEM THAT MEASURES AND REPORTS COMPUTATIONAL-RESOURCE USAGE IN A DATA CENTER

(71) Applicant: VMWARE, INC., Palo Alto, CA (US)

(72) Inventors: Kumar Gaurav, Bangalore (IN); Akhil Sadashiv Hingane, Bangalore (IN); Vijay Potluri, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 282 days.

(21) Appl. No.: 14/603,373

(22) Filed: Jan. 23, 2015

(65) Prior Publication Data

US 2016/0124773 A1 May 5, 2016

(30) Foreign Application Priority Data

Oct. 29, 2014 (IN) .......................... 5389/CHE/2014

(51) Int. Cl.
*G06F 9/46* (2006.01)
*G06Q 10/04* (2012.01)
*G06F 9/50* (2006.01)

(52) U.S. Cl.
CPC .............. *G06Q 10/04* (2013.01); *G06F 9/50* (2013.01); *G06F 2209/5014* (2013.01)

(58) Field of Classification Search
None
See application file for complete search history.

(56) References Cited

U.S. PATENT DOCUMENTS

| | | | | |
|---|---|---|---|---|
| 9,043,802 B2* | 5/2015 | Nadathur | ............... | G06F 9/505 712/10 |
| 9,240,025 B1* | 1/2016 | Ward, Jr. | ................. | G06F 9/50 |
| 2008/0086734 A1* | 4/2008 | Jensen | ................. | G06F 9/4881 718/104 |
| 2016/0188370 A1* | 6/2016 | Razin | .................... | G06F 11/30 718/104 |

* cited by examiner

*Primary Examiner* — Tammy Lee

(57) ABSTRACT

The present disclosure describes methods and systems that monitor the utilization of computational resources. In one implementation, a system periodically measures the utilization of computational resources, determines an amount of computational-resource wastage, identifies the source of the wastage, and generates recommendations that reduce or eliminate the wastage. In some implementations, recommendations are generated based on a cost of the computational-resource wastage. The cost of computational-resource wastage can be determined from factors that include the cost of providing a computational resource, an amount of available computational resources, and the amount of actual computational-resource usage. Methods of presenting and modeling computational-resource usage and methods that associate an economic cost with resource wastage are presented.

16 Claims, 26 Drawing Sheets

| Host Server Parameters | CPU | Memory | Storage | Internet Bandwidth | LAN Bandwidth |
|---|---|---|---|---|---|
| Units | GHz | GB | GB/Month | GB/Month | GB/Month |
| Installed Resource | 24 | 32 | 500 | 1000 | 20000 |
| Available Resource Cost | $100.00 | $20.00 | $0.50 | $2.00 | $0.01 |
| Configured Headroom | 2 | 8 | 50 | 200 | 1000 |

METHOD AND SYSTEM THAT MEASURES AND REPORTS COMPUTATIONAL-RESOURCE USAGE IN A DATA CENTER

Benefit is claimed under 35 U.S.C. 119(a)-(d) to Foreign application Serial No. 5389/CHE/2014 filed in India entitled "METHOD AND SYSTEM THAT MEASURES AND REPORTS COMPUTATIONAL-RESOURCE USAGE IN A DATA CENTER", filed on Oct. 29, 2014, by VMware. Inc., which is herein incorporated in its entirety by reference for all purposes.

TECHNICAL FIELD

The present disclosure is directed to methods and systems that manage computer resources and, in particular, to methods and systems that measure and report the underutilization of computational resources.

BACKGROUND

Advances in networking technology have fostered a move toward centralization of computational resources. In particular, desktop personal computers are being replaced by network-connected mobile devices and thin clients that provide a user interface and display functions, with a portion of processing, storage, and memory resources provided remotely by datacenters over a network connection.

The datacenters generally provide these resources using one or more computer systems that act as hosts for application programs, server programs, or virtual machines operated by clients. Efficient operation of a datacenter involves properly selecting and configuring host computer systems that are able to meet the demands of a client's applications and programs at a reasonable cost. If the datacenter is unable to provide enough computational resources during times when demand for computational resources is high, performance of client applications and programs will be impaired. If the datacenter installs excessive computational resources where demand is low, the additional resources will be underutilized and increase the cost of operating the datacenter.

SUMMARY OF THE DISCLOSURE

The present disclosure describes methods and systems that monitor the utilization of computational resources. In one implementation, a system periodically measures the utilization of computational resources, determines an amount of computational-resource wastage, identifies the source of the wastage, and generates recommendations that reduce or eliminate the wastage. In some implementations, recommendations are generated based on a cost of the computational-resource wastage. The cost of computational-resource wastage can be determined from factors that include the cost of providing a computational resource, an amount of available computational resources, and the amount of actual computational-resource usage. Methods of presenting and modeling computational-resource usage and methods that associate an economic cost with resource wastage are presented.

DETAILED DESCRIPTION

Figure 1:
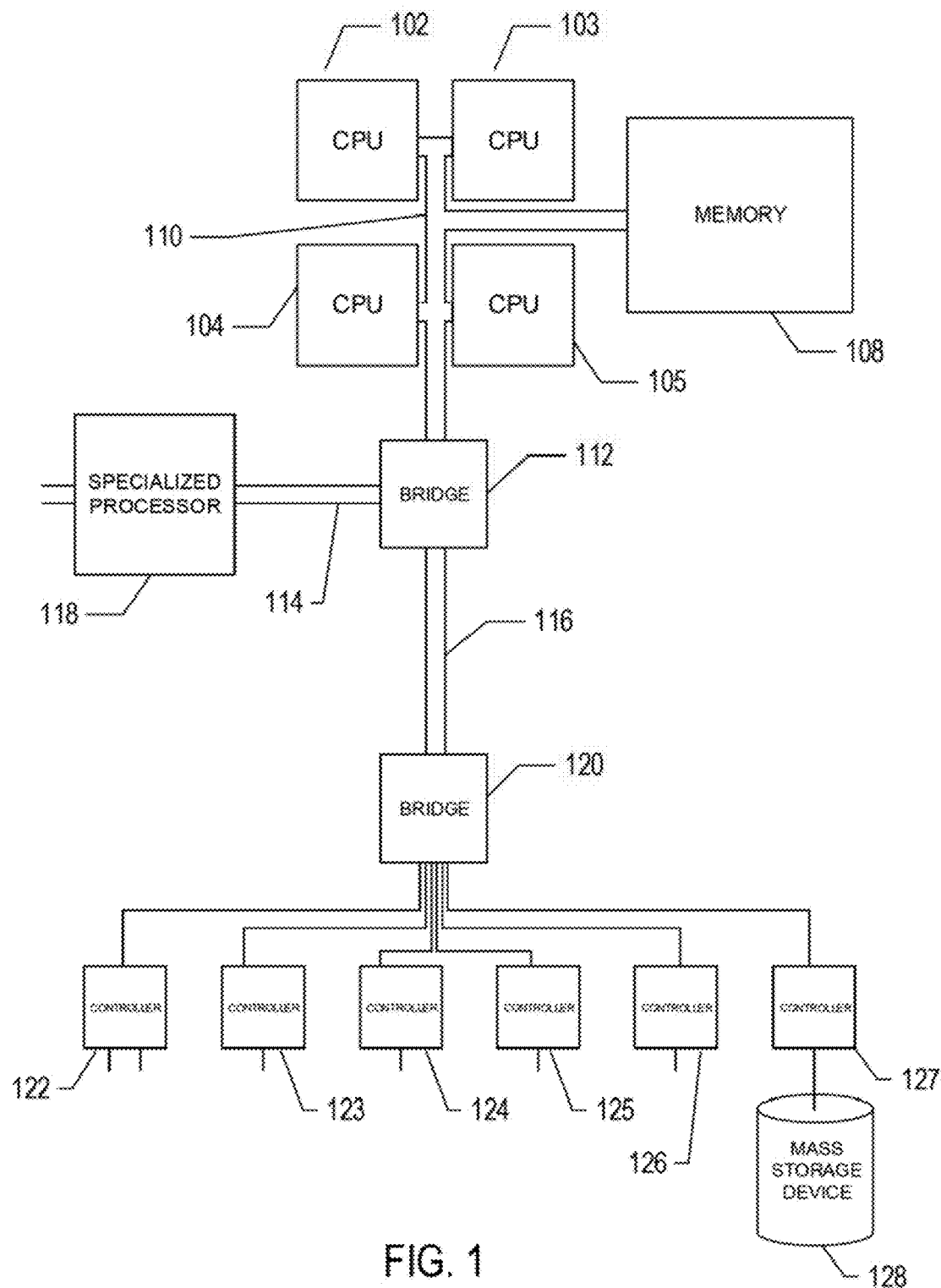
FIG. 1 illustrates a general architectural diagram for various types of computers.

The present disclosure is directed to methods and systems that monitor usage of computational resources and, in particular, to methods and systems that measure and report underutilization of computational resources in a datacenter that hosts one or more virtual machines ("VMs") and/or application programs. The datacenter includes a number of host computer systems that are modeled as a bundle of categorized computational resources. Examples of computational resources include processing power, memory, storage, input/output capacity, Internet data transfer, and local area network bandwidth. Computational resources of a host computer system are allocated to and consumed by computational loads that may include application programs, VMs, interactive user login sessions, batch processing, and operating system functions. Each computational load is modeled as an aggregate of the loads on each computational resource category provided by the datacenter. For example, the computational load imposed by a client's application program can be described as using 2.4 gigabytes ("GB") of hard disk space, 4 GB of memory, and 2 processing cores of at least 2 gigahertz ("GHz") per hour. The cost of operating and maintaining the datacenter is related to the number of computing systems in the datacenter, as well as the amount of resources connected to each computing system. For example, computing systems with faster central processing units ("CPU"), increasing amounts of memory, and larger storage capabilities tend to cost more to own and operate. The cost of operating a datacenter is often allocated to clients based on the computational loads imposed on the datacenter by each client. One way of allocating costs is to establish a price per unit for each computational resource that is based on the cost of ownership and operation of the datacenter. Once the price per unit of a particular computational resource has been set, a bill can be generated based for the usage of the particular computational resource that is attributable to each computational load. One problem with this approach is that computational loads can be highly variable. Owners and operators of datacenters respond to varying loads by increasing the amount of installed computational resources to handle the peak aggregate computational load. However, this can lead to significant amounts of unused computational resources during off-peak times. This wastage of computational resources creates an unrecovered cost for the owner of the datacenter. The methods and systems described in the present disclosure provide a way for datacenter owners and operators to measure and quantify the wastage of computational resources.

In order to describe the methods and systems to which the present disclosure is directed, the detailed-description section of the present disclosure includes four subsections: (1) a brief discussion of computer architecture and VMs; (2) a discussion of host-side resource utilization, wastage, and economic loss; (3) a discussion of client-side resource utilization, wastage, and economic loss; and (4) a discussion of methods and systems that measure and manage datacenter resources.

A Brief Overview of Computer Architecture and VMs

FIG. 1 provides a general architectural diagram for various types of computer systems. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, network interfaces, and other such components, subcomponents, and computational resources.

Figure 2:
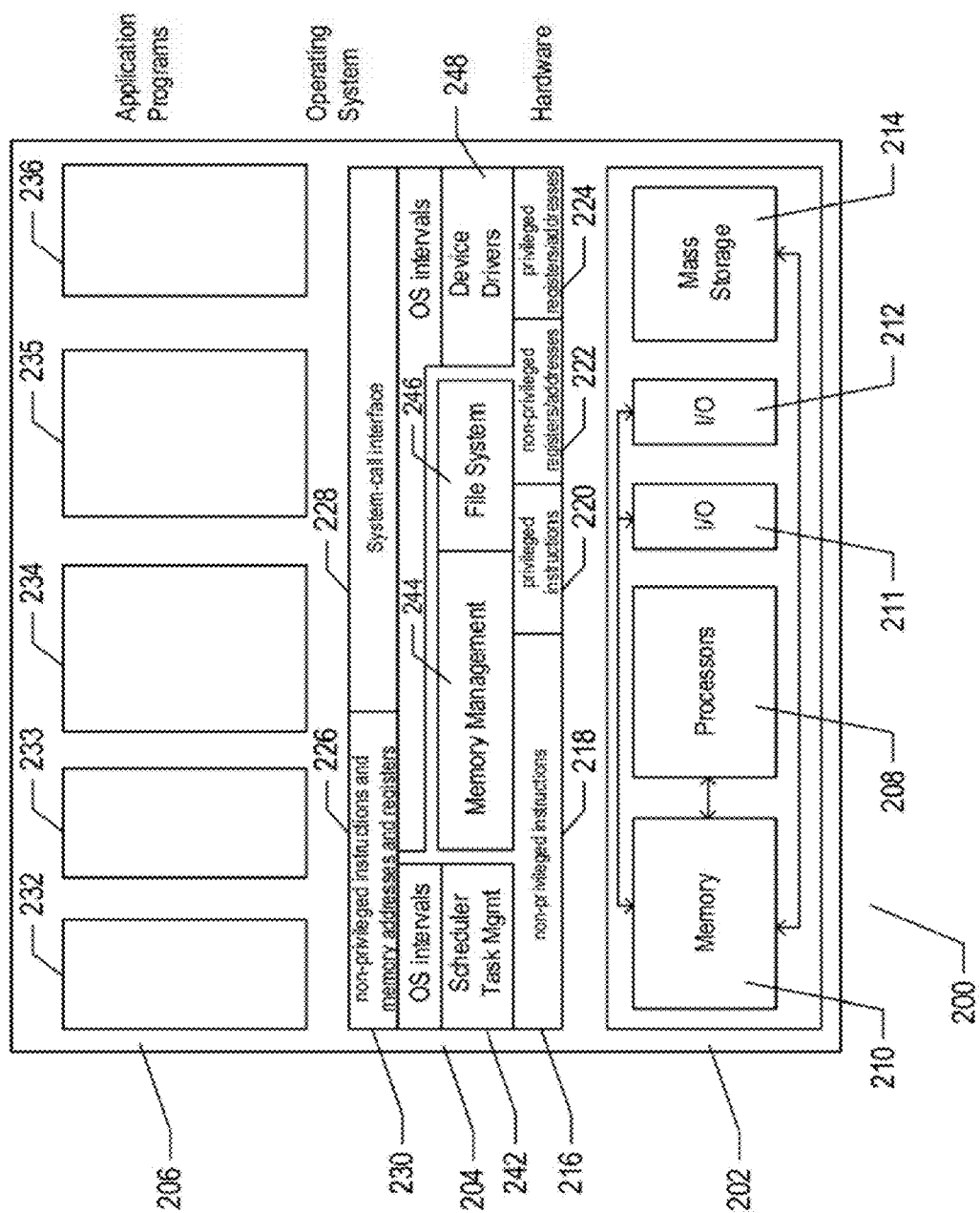
FIG. 2 illustrates generalized hardware and software components of a general-purpose computer system, such as a general-purpose computer system having an architecture similar to that shown in FIG. 1.

FIG. 2 illustrates generalized hardware and software components of a general-purpose computer system, such as a general-purpose computer system having an architecture similar to that shown in FIG. 1. The computer system 200 is often considered to include three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 211 and 212, and mass-storage devices 214. The hardware level may include other components, including power supplies, internal communications links and busses, specialized integrated circuits, different types of processor-controlled or microprocessor-controlled peripheral devices and controllers, and other components. The operating system layer 204 interfaces to the hardware layer 202 through a low-level operating system and hardware interface 216 generally comprising a set of non-privileged processor instructions 218, a set of privileged processor instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. Modern operating systems provide one or more levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone execution environment devoted to the application program. From the application program's standpoint, the application program executes continuously without concern for the need to share processor resources and other system resources with other application programs and higher-level computational entities. The device drivers abstract details of hardware-component operation, allowing application programs to employ the system-call interface when transmitting and receiving data to and from communications networks, mass-storage devices, and other I/O devices and subsystems. The file system 246 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3:
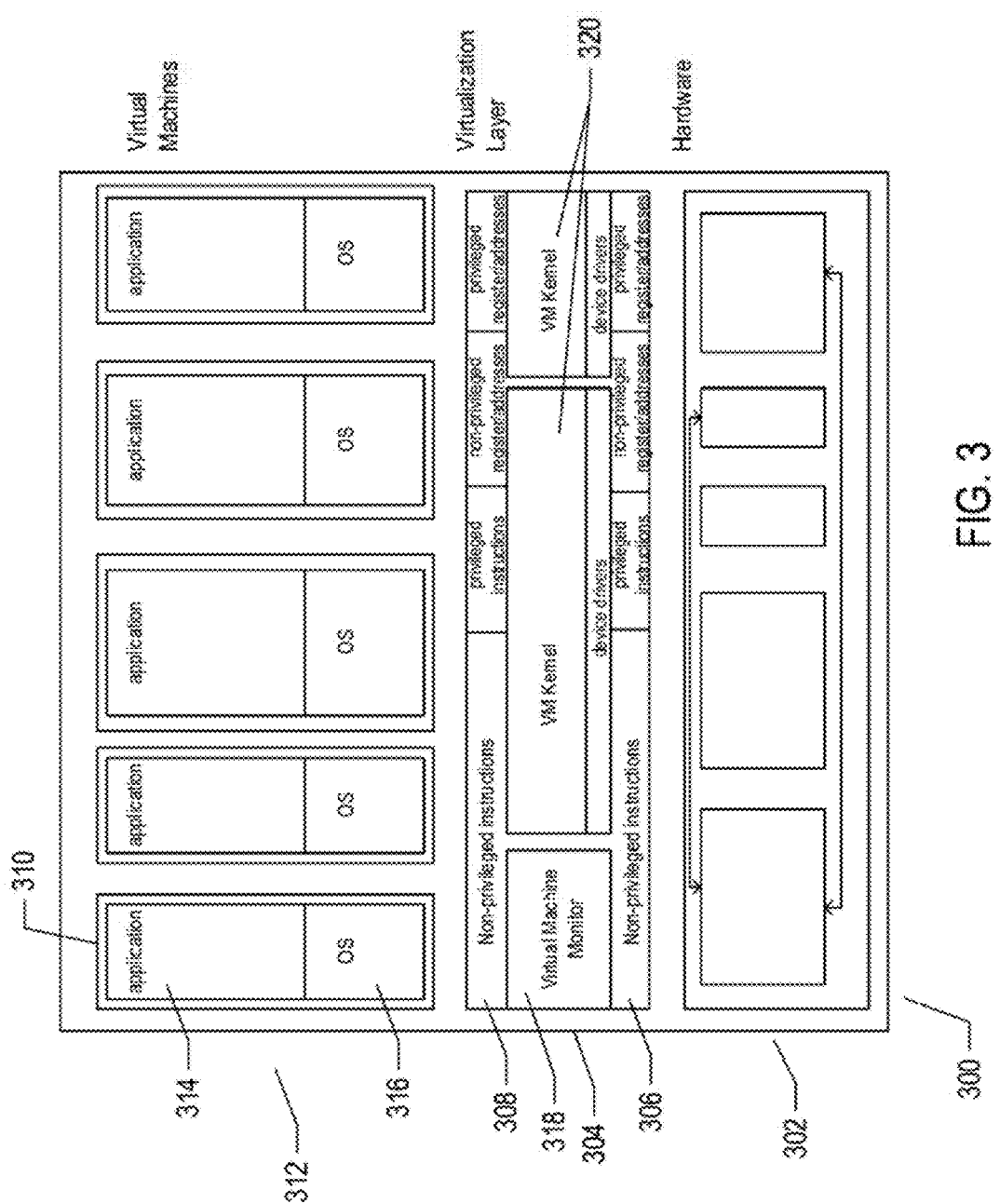
FIG. 3 illustrates one type of virtual machine and virtual-machine execution environment.

For these reasons, a higher level of abstraction, referred to as the "virtual machine," has been developed and evolved to further abstract computer hardware in order to address many difficulties and challenges associated with traditional computing systems, including the compatibility issues discussed above. FIG. 3 illustrates one type of virtual machine and virtual-machine execution environment. FIG. 3 uses the same illustration conventions as used in FIG. 2. In particular, the computer system 300 in FIG. 3 includes the same hardware layer 302 as the hardware layer 202 shown in FIG. 2. However, rather than providing an operating system layer directly above the hardware layer, as in FIG. 2, the virtualized computing environment illustrated in FIG. 3 features a virtualization layer 304 that interfaces through a virtualization-layer/hardware-layer interface 306, equivalent to interface 216 in FIG. 2, to the hardware. The virtualization layer provides a hardware-like interface 308 to a number of VMs, such as VM 310, executing above the virtualization layer in a virtual-machine layer 312. Each VM includes one or more application programs or other higher-level computational entities packaged together with an operating system, such as application 314 and operating system 316 packaged together within VM 310. Each VM is thus equivalent to the operating-system layer 204 and application-program layer 206 in the general-purpose computer system shown in FIG. 2. Each operating system within a VM interfaces to the virtualization-layer interface 308 rather than to the actual hardware interface 306. The virtualization layer partitions hardware resources into abstract virtual-hardware layers to which each operating system within a VM interfaces. The operating systems within the VMs, in general, are unaware of the virtualization layer and operate as if the operating systems were directly accessing a true hardware interface. The virtualization layer ensures that each of the VMs currently executing within the virtual environment receive a fair allocation of underlying hardware resources and that the VMs receive sufficient resources to progress in execution.

The virtualization-layer interface 308 may differ for different operating systems. For example, the virtualization layer is generally able to provide virtual hardware interfaces for a variety of different types of computer hardware. This allows, as one example, a VM that includes an operating system designed for a particular computer architecture to run on hardware of a different architecture. The number of VMs need not be equal to the number of physical processors or even a multiple of the number of processors. The virtualization layer includes a virtual-machine-monitor module 318 that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the operating system within a VM accesses virtual privileged instructions, virtual privileged registers, and virtual privileged memory through the virtualization-layer interface 308, the accesses result in execution of virtualization-layer code to simulate or emulate the privileged resources. The virtualization layer additionally includes a kernel module 320 that manages memory, communications, and data-storage machine resources on behalf of executing VMs. The kernel, for example, maintains shadow page tables on each VM so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of VMs much like an operating system schedules execution of application programs, so that the VMs each execute within a complete and fully functional virtual hardware layer.

Figure 4:
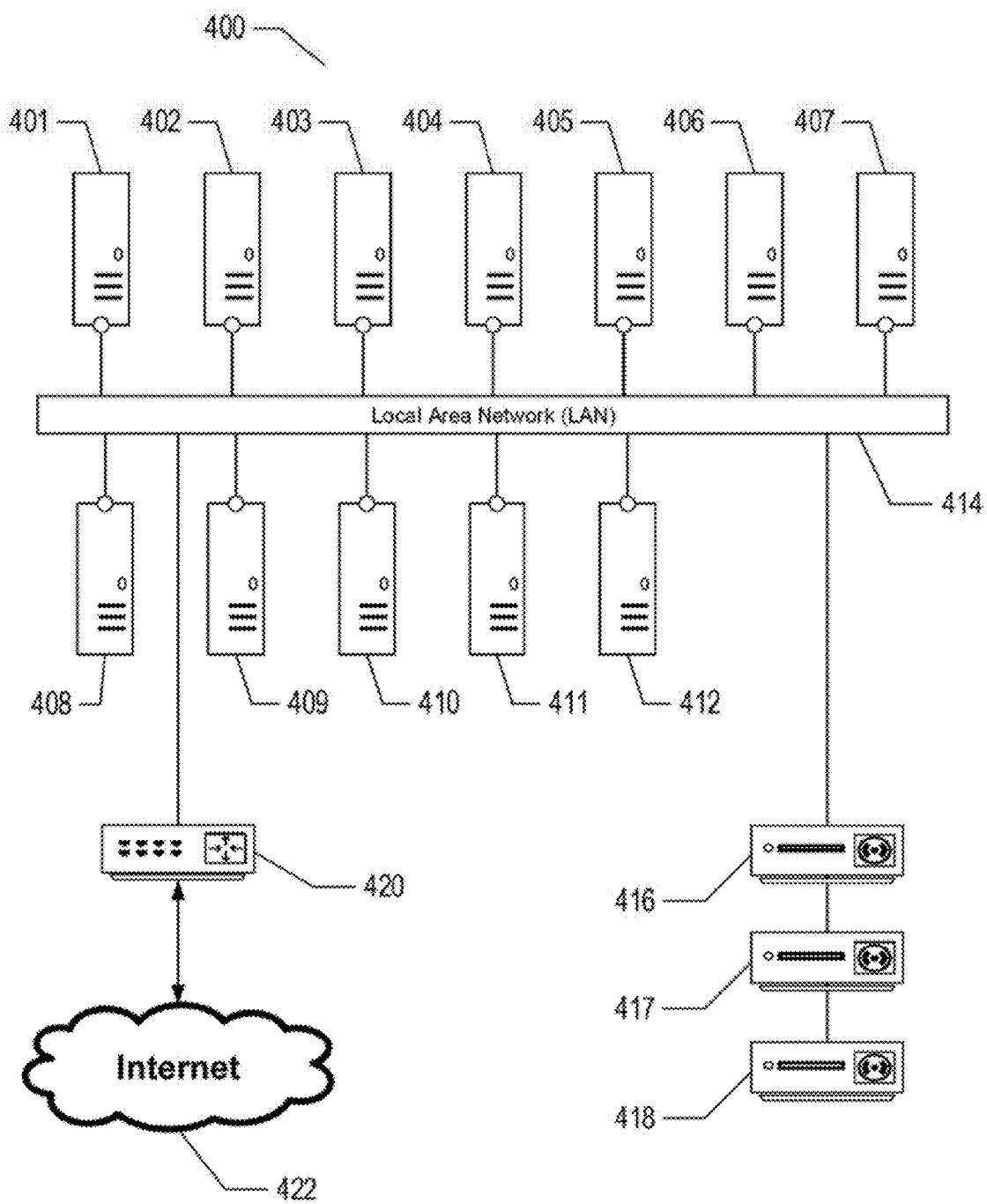
FIG. 4 illustrates a datacenter having multiple computing systems.

Modern datacenters provide mixtures of general-purpose computer systems and virtual-machine execution environments, as well as configurable network-connected storage resources, and Internet connectivity. An example of a modern datacenter is illustrated in FIG. 4. The datacenter 400 includes computer systems 401-412. Each computer system can act as a host for application programs, VMs, or a combination of application programs and VMs. In some situations, a particular computer system is dedicated to hosting a single application program. The computer systems 401-412 are interconnected via a local area network ("LAN") 414. A suitable local area network can be constructed using Ethernet, Fiber optic, Wireless, or other networking technologies. The local area network 414 connects the computer systems 401-412 to external resources including remote disk storage devices 416-418, and routers 420. As illustrated, the router 420 is connected to the Internet 422. In other datacenter implementations, the local area network is connected to database servers, printers, scanners, or optical storage systems.

For a large company, a datacenter may be used to reduce cost by replacing numerous distributed computational resources with a smaller number of highly capable server-class computer systems, such as the computer systems 401-412 in FIG. 4. Generally, the cost of operation for the datacenter is less than the total operating expense of the distributed computing systems. Efficient use of datacenter resources is achieved by accurately accounting for the computational loads to be consolidated, and by installing a combination of dedicated computing systems, general purpose computing systems, and virtual-machine execution environments that are properly adapted to hosting the computational loads. Computational loads and datacenter resources can be modeled as a collection of resource demands and a corresponding collection of resource supplies, respectively. For example, when a particular computer system in a datacenter is modeled as a pool of available processing, memory, storage, local area network, and Internet resources, a hosted computational load is generally modeled as a set of demands for the same computational resource categories. Multiple computational loads can be hosted by a single host computer system when the sum of the computational loads is less than the pool of available resources provided by the host computer system.

The cost of operating a datacenter like the one described and illustrated in FIG. 4 can be modeled in terms of the cost of providing the various computational resources to hosted application programs, VMs, or other computational loads. The total cost of a computer system includes the cost of the hardware, operating system software, rack space, utilities, and maintenance. This total cost is distributed over the various computational resources the computer system provides, and over the expected lifetime of the computational resource. In the following examples, the computational resources are categorized into processing, storage, memory use, storage use, LAN data transfer, and Internet data transfer. Other categorizations of resources are possible. For example, some datacenter operators might choose to not account for LAN data transfer, while other operators might account for the number of pages printed on shared printing resources. Regardless of the resource categories used, it is not usually possible or practical for 100% of installed resources to be made available to client computational loads. Some resources are consumed by the datacenter itself for operating system functions and overhead. Some amount of resource headroom is defined for each computational resource to account for overhead, burst computational loads, additional computational loads, or future growth of present computational loads. In some environments, certain resources reserved for headroom are not available for servicing client computational loads. The cost of supplying computational resources to a client's computational loads are distributed over the available computational resources. For example, consider a particular computer system installed in a datacenter that contains 32 GB of random access memory ("RAM"), where the useful lifetime of the particular computer system is expected to be 3 years, and where the lifetime cost of purchasing, maintaining, and operating the memory subsystem of the particular computer system is estimated to be $1200. If the particular computer system uses an average of 2 GB of RAM for overhead and other non-client functions, 30 GB of memory space remains available to clients. For the operator of the datacenter, the cost of providing a unit of this memory to clients on a monthly basis is:

$$\text{Resource Cost} = \frac{\text{Total Resource Cost}}{(\text{Total Resource Installed} - \text{Headroom}) * \text{Expected Lifetime}}$$

$$\text{Available Resource Cost} = \frac{\$1200}{(32GB - 2GB) * 36 \text{ Months}} = \$1.11 \text{ per GB per Month}$$

The available resource cost ("ARC") represents the unit cost per time period of supplying an available computational resource. ARC represents the lowest sustainable price that the datacenter could offer clients, if the datacenter operator could attain a resource utilization that fully uses the available computational resources. In practice, the datacenter cannot normally achieve full utilization of resources, so either the operator of the datacenter passes on the losses to the client in some way, such as higher prices, or absorbs the operational economic loss. Sample code is provided in the listings below.

Host-Side Utilization, Wastage, and Economic Loss

Figure 5:
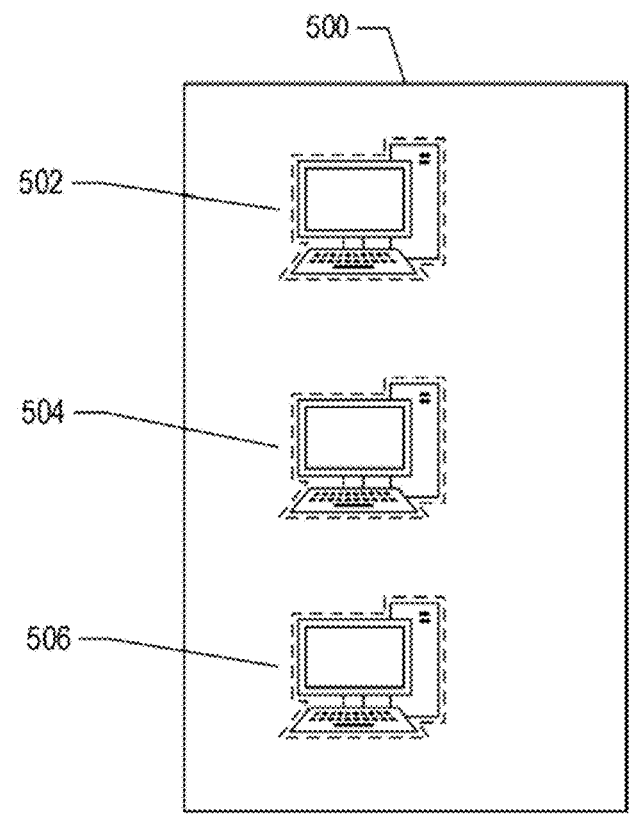
FIG. 5 illustrates a host computer system hosting three virtual machines and a table itemizing computational resources installed on the host computer system.

FIG. 5 illustrates a computer system 500 hosting three VMs 502, 504, 506 and a resource table 507 itemizing computational resources installed on the computer system. Host computer system 500 acts as a host for three virtual-machine environments: a first VM 502, a second VM 504, and a third VM 506. The resource table 507 enumerates the resources installed in the host computer system 500. The resources are shared between the three VMs 502, 504, and 506 that together comprise the total client computational load on the host computer system 500. Each computational resource column of the resource table 507 shows the amount of each category of computational resource that is installed in the computer system, the cost per unit per month of the computational resource, and the amount of the resource that is held in reserve, also called the headroom.

Available processing power is described in the column labelled "CPU" 508. Processing power may be quantified in absolute or relative terms, and is often measured simply as a percentage of total available processing power. In certain implementations, an absolute measure of processing power is provided in terms of operating clock frequency or in terms of computational operations per second. Many modern processing units include multiple processing cores that run more-or-less independently. In this case, the amount of processing power can be expressed as the number of processing cores multiplied by the speed of operation of the processing cores. In the example shown, installed CPU 508 is shown as 24 Ghz/month. In a particular physical implementation, this could be provided by a processor having 8 cores running at 3 GHz (3*8=24). The ARC of CPU is estimated to be $100 per Ghz*core/month. The estimation of available resources is based in part on the cost of the hardware that makes up the resource, and also floor space, maintenance expenses, the cost of operational personnel, and overhead including any headroom for operation of the system. For example, if CPU headroom is 2 Ghz/month, 22 of the 24 installed Ghz will be available for servicing computational loads. The designation of headroom allows the host computer system 500 to handle burst computational loads, and provides resources for housekeeping tasks associated with the administration of the VM environments.

Available memory resources are described in a memory column 510. Examples of memory devices include short-term rapid-access storage devices, such as SDRAM, DDR RAM, and RDRAM storage devices. In contemporary computing systems, memory is quantified in terms of information storage capacity, such as kilobytes ("KB"), megabytes ("MB"), or gigabytes ("GB"). In the example of FIG. 5, the host computer system 500 is configured with 32 GB of memory. The ARC of memory is estimated to be $20 per GB/Month, and 8 GB or memory is reserved for headroom. As a result, 24 GB of memory remains available for servicing computational loads.

Available storage resources are described in a storage column 512. Storage includes long-term persistent storage resources, such as magnetic disk drives, optical disk storage, FLASH memory, or magnetic tape storage. Modern storage systems are measured in terms of storage capacity in units of gigabytes or terabytes. Storage costs tend to be lower than memory storage costs. The estimated ARC of storage resources is $0.50/GB per month. In the example of FIG. 5, the host computer system 500 is configured with 500 GB of storage space, and 50 GB of headroom. As a result, 450 GB is available for servicing computational loads.

Available Internet bandwidth is described in an Internet-Bandwidth column 514. Internet bandwidth may be purchased from an Internet service provider ("ISP") with a service level specified by a peak data transfer rate, and a maximum amount of data transfer per month. In the example shown in FIG. 5, Internet bandwidth is provided with a data transfer limit of 1,000 GB per month. The cost of the service is estimated at $2 per GB per month, and a headroom of 200 GB is reserved. 800 GB of data transfer is available for client use each month.

Local area network bandwidth is described similarly to Internet bandwidth, and is recorded in column 516. Since the cost of local area networking is determined mostly by the fixed cost of networking equipment installed in the datacenter, the cost per GB of data transfer tends to be lower than the cost of sending the same data over the Internet. In the example shown in FIG. 5, the amount of LAN transfer resource available is 20,000 GB of data transfer per month at a cost of $0.01 per GB per month. Only 1.000 GB of data transfer capacity is maintained for headroom, and 19,000 GB of LAN data transfer is available for servicing client computational loads each month.

The resource table 507 shown in FIG. 5 represents one way to model a computer system. In other implementations, resource columns are added or removed to the model, and the resources are accounted for in different ways. For example, LAN bandwidth is not measured in some implementations. In other implementations, processing capacity is expressed and recorded as a percentage of the total available processing capacity. In the example shown, average resource cost is expressed as a fixed cost per unit of computational resource, but in other models average resource cost is expressed as a function of the computational load on the host computer system. For some computational resources, the incremental cost the resource increases as the amount of resource supplied increases. The increase in incremental cost may be linear or non-linear, and a corresponding price increase is often passed on to clients in order to incentivise the efficient use of computational resources.

In some host computer systems, headroom is implemented as a soft reservation of resources. When there is a soft headroom reservation, computational resources reserved for headroom are usually used to cover overhead, such as managing VMs, but when the resources associated with headroom are not in use, the resources are reallocated to other computational loads, such as burst loads, or client computational loads. Resources associated with headroom may also be used to facilitate increasing or new computational loads. For example, resources allocated to headroom are available for unanticipated computational loads when headroom resources are otherwise unused. When headroom resources are used in this way, in certain implementations, a recommendation is generated that indicates that additional computational resources should be added to the computer system to restore proper headroom. Alternatively, other host systems use a hard reservation for headroom resources, and in this case, resources reserved for headroom may not be repurposed for handing non-headroom computational loads.

A host computer system that is hosting multiple client VMs, such as the host computer system 500, can have multiple simultaneous resource reservations, both hard and soft, for each category of computational resource. Some resource categories are more suited to soft reservation schemes, whereas others are more suited to hard reservations. For example, processing power is usually reserved with a soft reservation. When a reserved unit of processing power is unused, a computational-resource manager can easily allocate the unused processing power to a computing process that requests additional processing capacity. If the owner of the reservation later demands the reserved processing resources, the reserved resources are reallocated to the owner of the reservation. Therefore, there is little penalty associated with borrowing reserved processing capacity, and the reservation acts like a prioritization-of-resources mechanism rather than an exclusive-reservation-of-resources mechanism. In another example, storage space is usually reserved using a hard reservation because once storage space is allocated, the allocated storage space cannot be easily recovered and reallocated without irretrievably losing stored information.

Resource table 507 of FIG. 5 describes the computational resources available for handing computational loads that are hosted by the host computer system 500. If the computational loads are modeled using similar resource categories and units of measure, then the computational loads can be summed to predict the aggregate computational load on the host computer system 500. For example, the total computational load on the host computer system 500 is determined by adding the similarly-modeled computational loads of the three VMs 502, 504, and 506. Example computational loads of the three VMs 502, 504, and 506 are illustrated in FIGS. 6A-C, 7A-C, and 8A-C respectively.

Figure 6A:
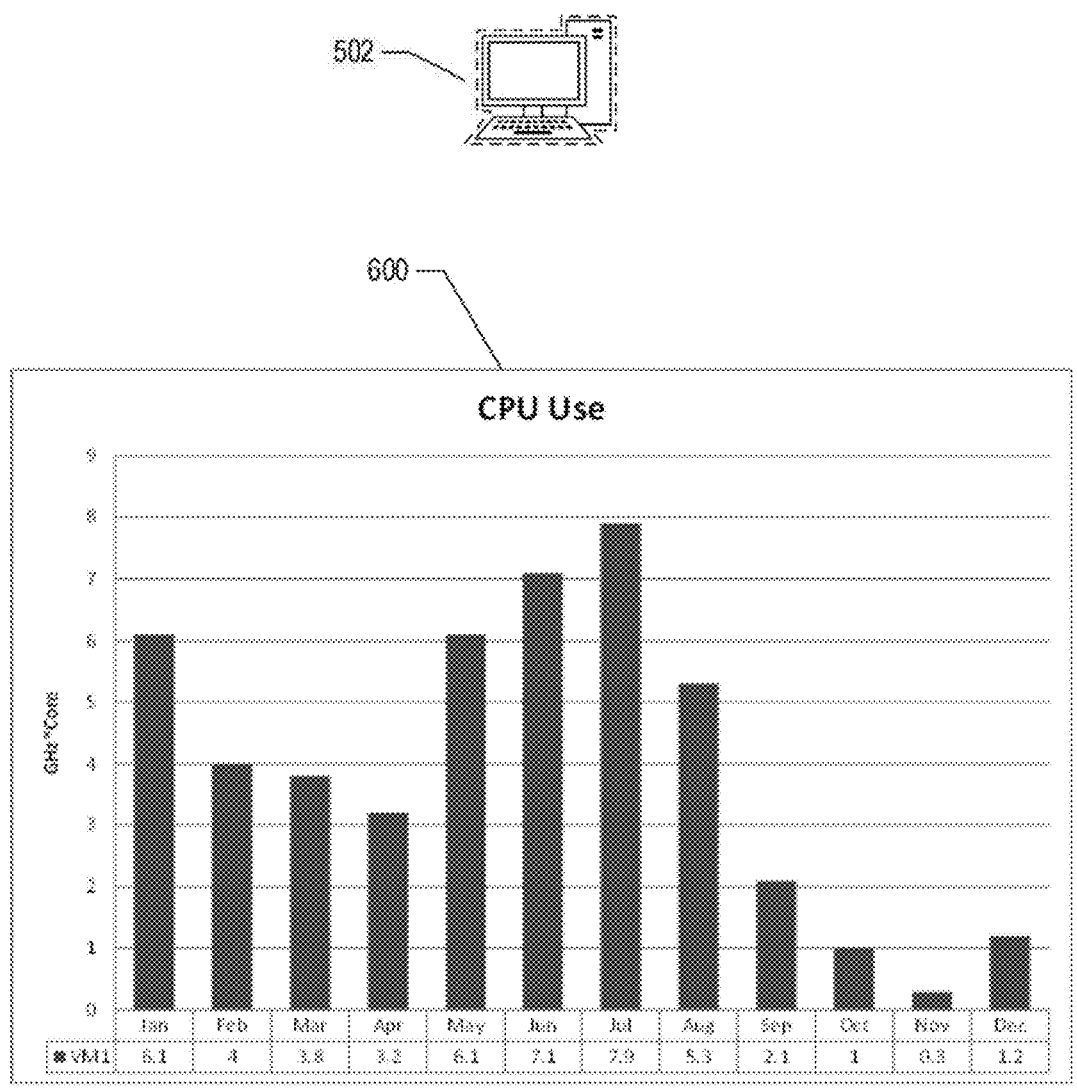
FIGS. 6A-C illustrate computational load charts for a first virtual machine.
Figure 6B:
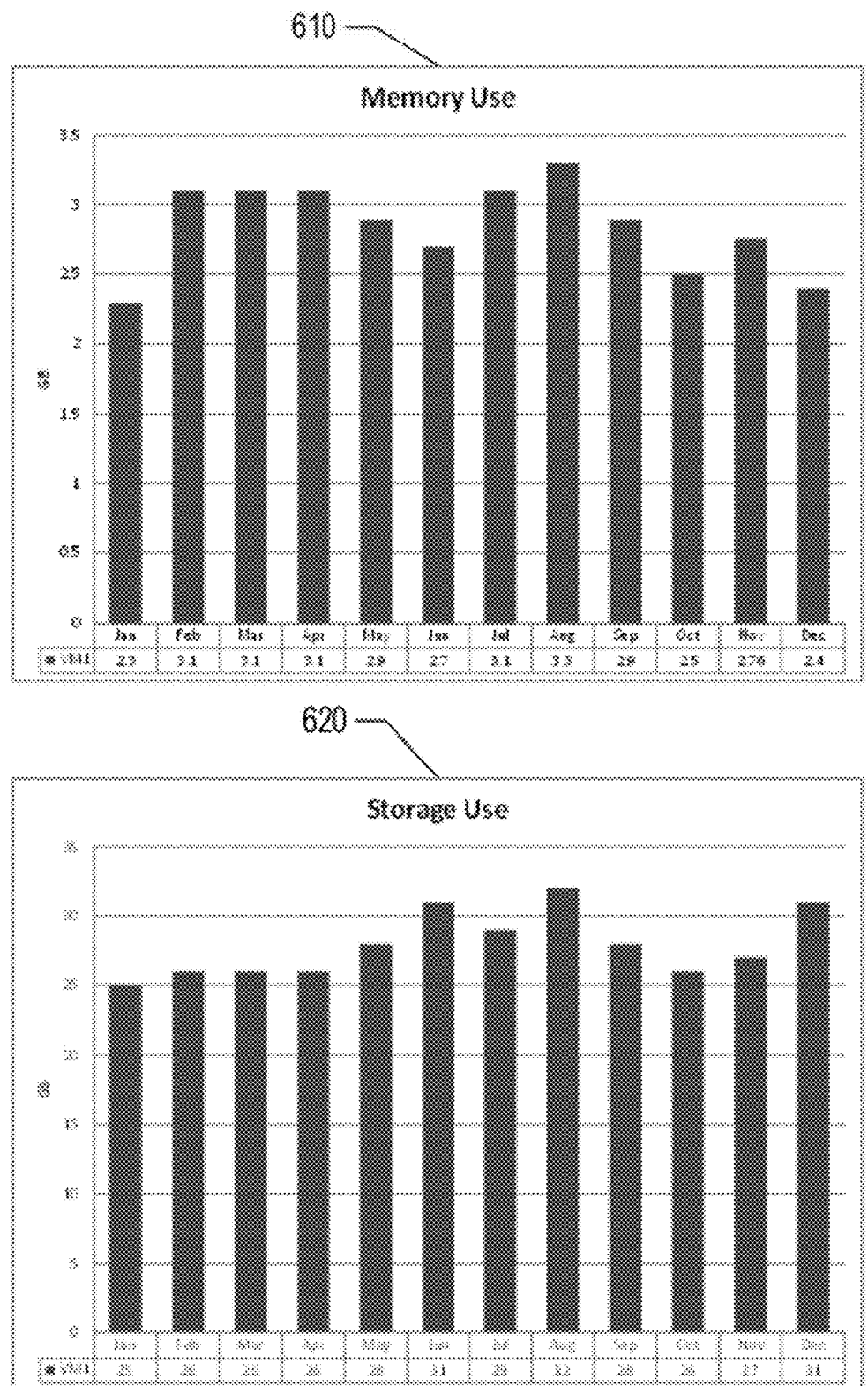
Figure 6C:
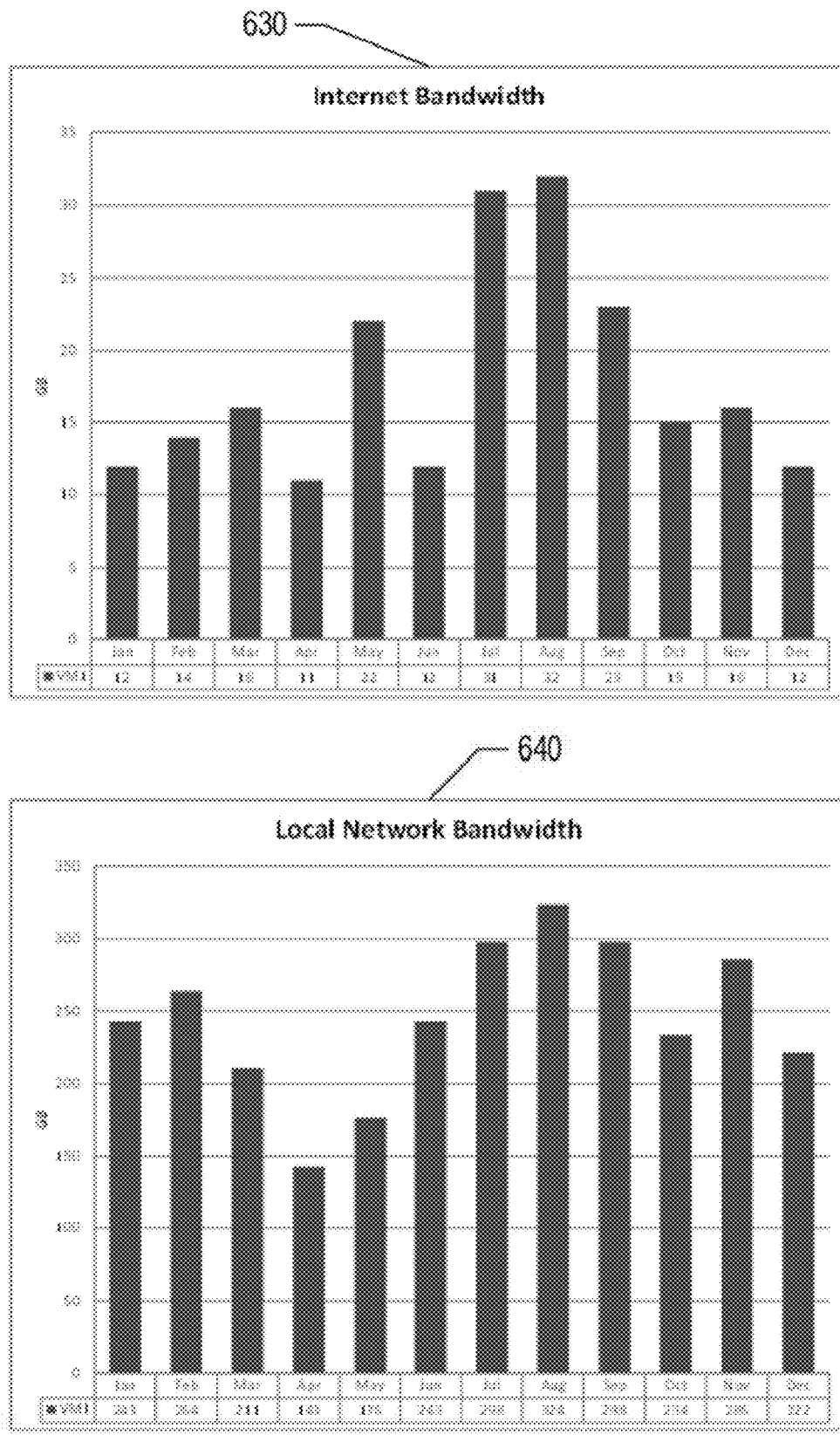

The example computational loads for first VM 502 are illustrated in FIGS. 6A-C. Five bar charts illustrate the use of each computational resource associated with first VM 502, on a monthly basis, for a period of one year. Chart 600 in FIG. 6A illustrates the use of processing capacity or CPU. For example, in the month of July, first VM 502 used 7.9 Ghz of processing capacity of the host computer system 500. Chart 610 in FIG. 6B illustrates the use of memory resources. Chart 620 in FIG. 6B illustrates the use of persistent storage capacity. Chart 630 in FIG. 6C shows Internet usage, and the final chart 640 in FIG. 6C shows local area network use. Network use, whether local or Internet, can be measured and managed by allocation of a transfer rate, or by managing the amount of transfer. In charts 630 and 640, network resources are measured in terms of the amount of data transferred over a monthly sampling period.

Figure 7A:
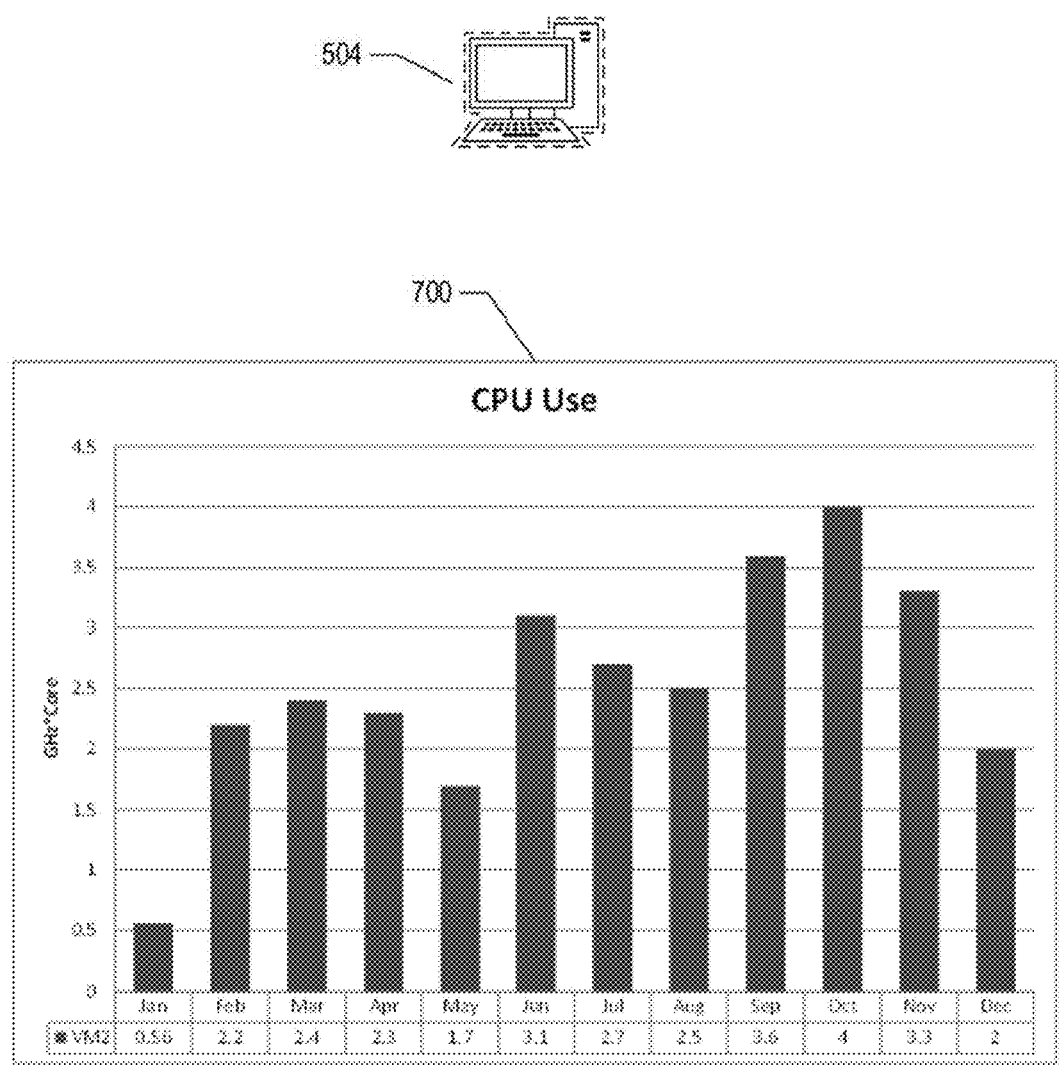
FIGS. 7A-C illustrate computational load charts for a second virtual machine.
Figure 7B:
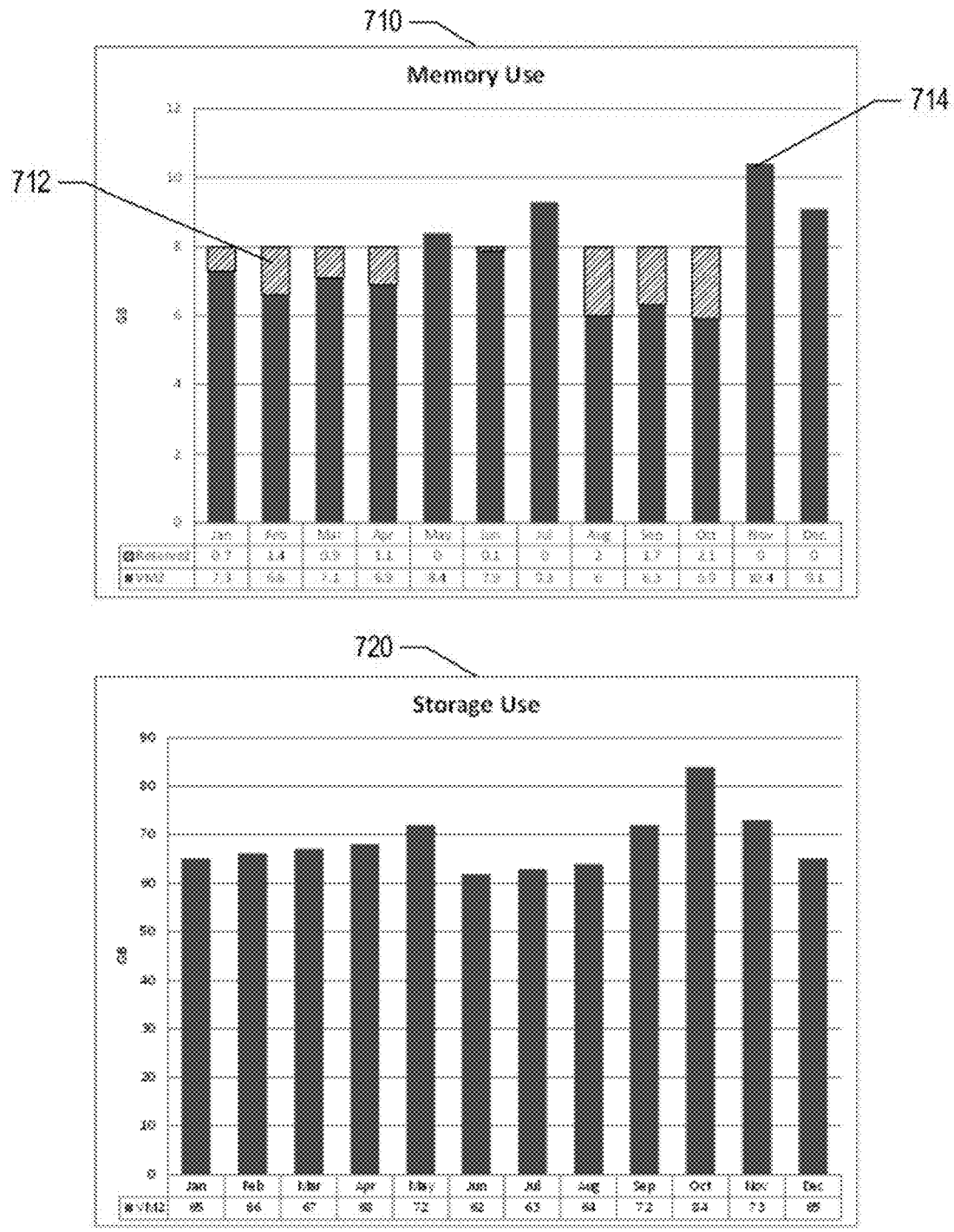
Figure 7C:
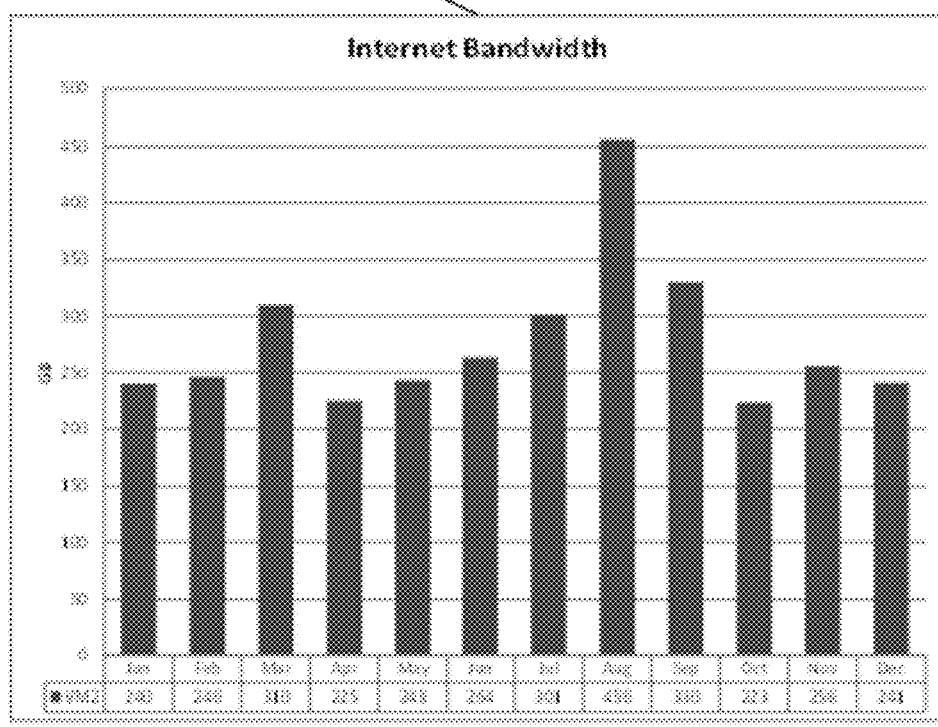
Figure 7C:
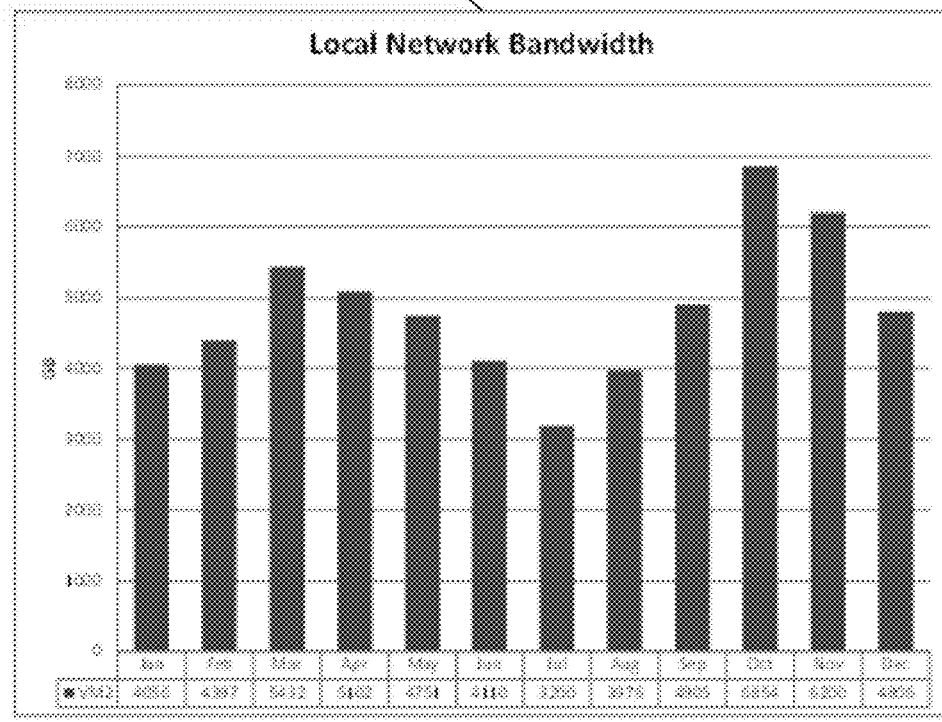

The example computational loads for second VM 504 are illustrated in FIGS. 7A-C. Five individual bar charts each show usage of an individual computational resources associated with second VM 504, on a monthly basis, for a period of one year. Chart 700 in FIG. 7A shows the use of processing capacity or CPU. Chart 710 in FIG. 7B shows the use of memory resources. The memory resource demands of second VM 504 includes a minimum memory reservation. The effect of the minimum memory reservation is represented in the chart 710 as unutilized memory 712 when the amount of memory used is less than the reservation amount. For example, in February, actual memory use is 6.6 GB and the amount of the memory reservation is 8 GB. There is an amount of unused and reserved memory of 1.4 GB in the month of February. When the amount of memory used is equal to or greater than the amount of the minimum memory reservation, there is no unutilized memory 714. In November, actual memory use was 10.4 GB, and the amount of the memory reservation was 8 GB. The reserved memory resource was fully used as is shown at 714 in chart 710. Chart 720 in FIG. 7B illustrates the use of persistent storage capacity such as hard disk storage or flash memory storage. Chart 730 in FIG. 7C shows Internet usage, and the final chart 740 in FIG. 7C, shows local area network use.

Figure 8A:
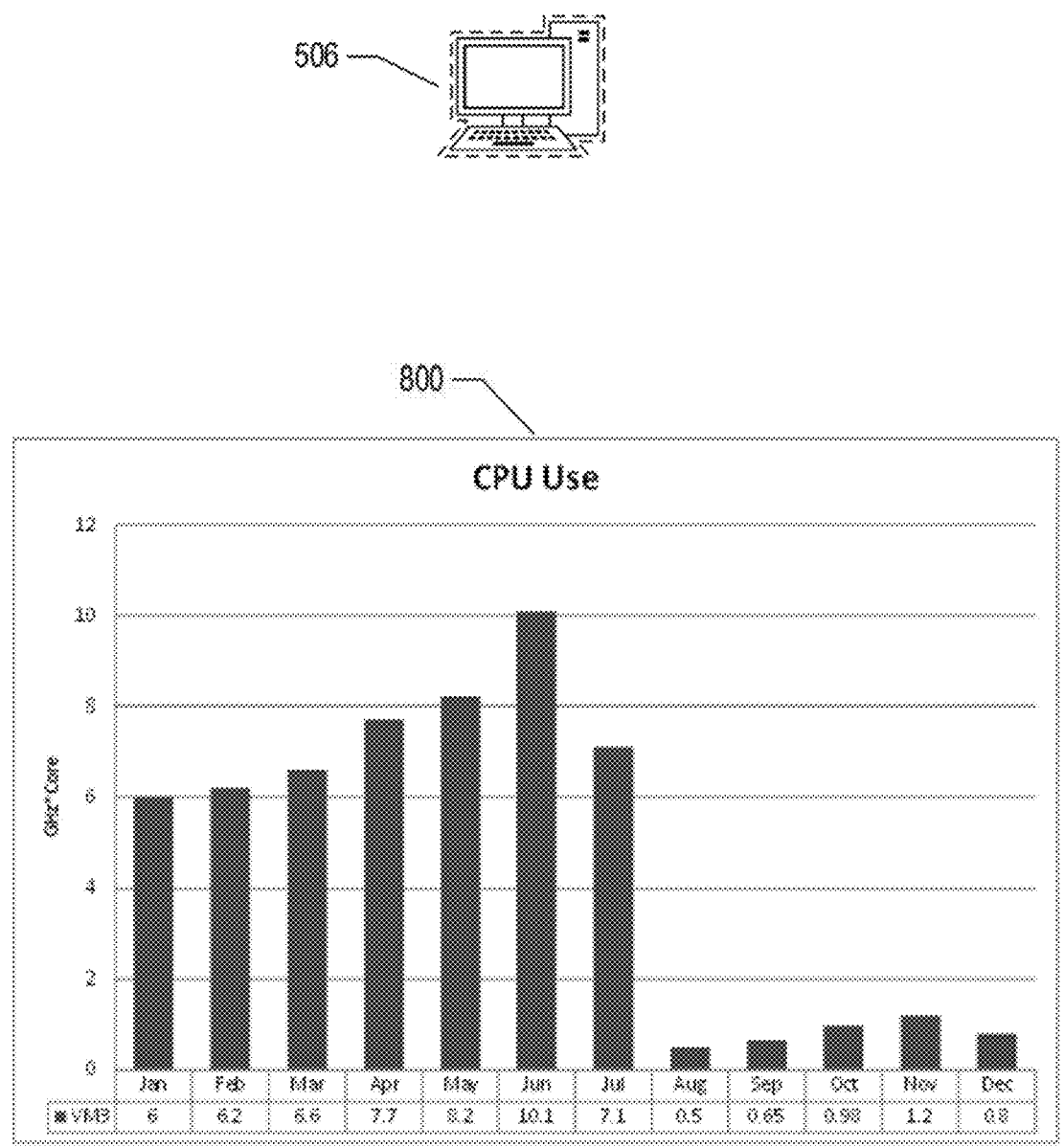
FIGS. 8A-C illustrate computational load charts for a third virtual machine.
Figure 8B:
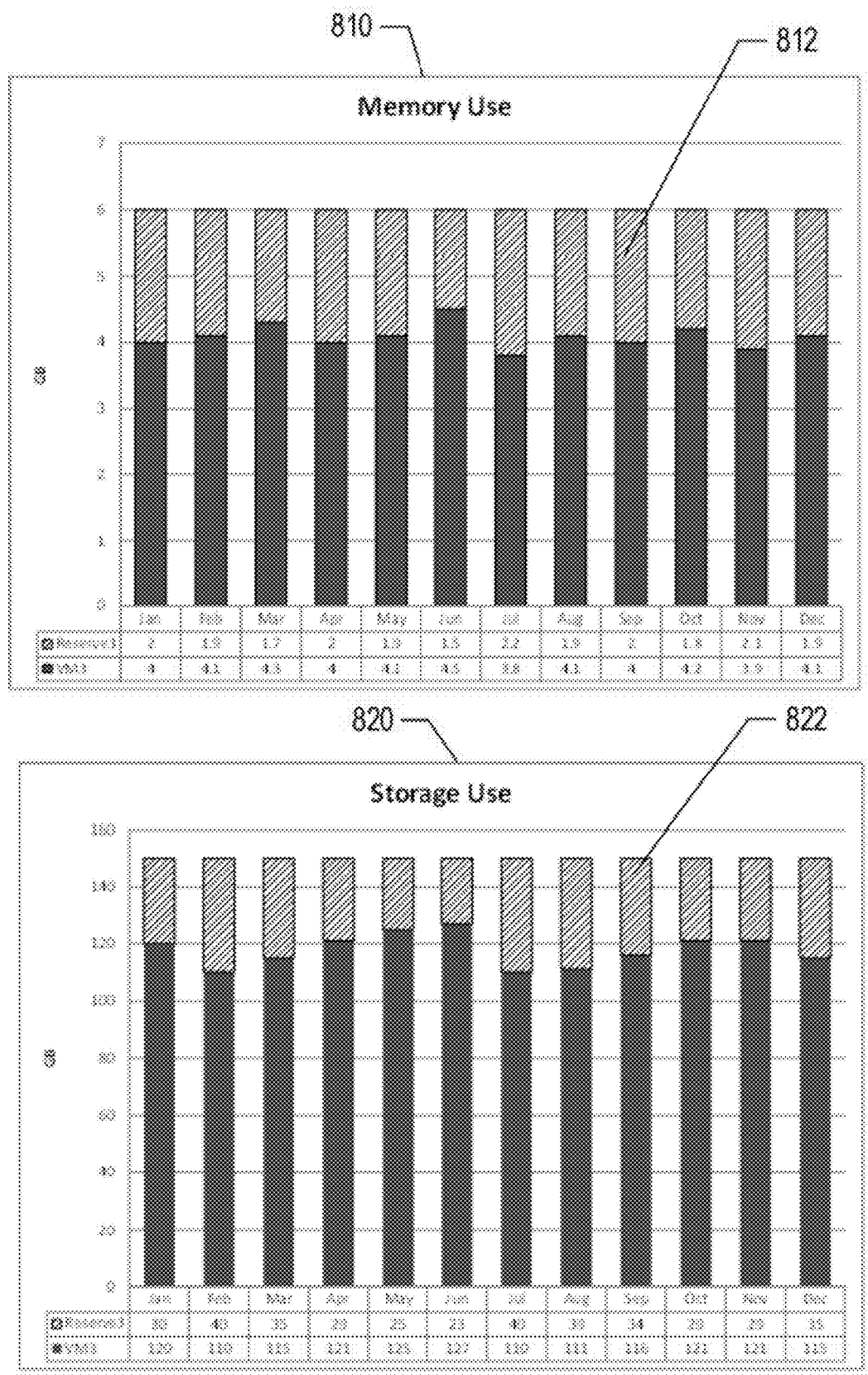
Figure 8C:
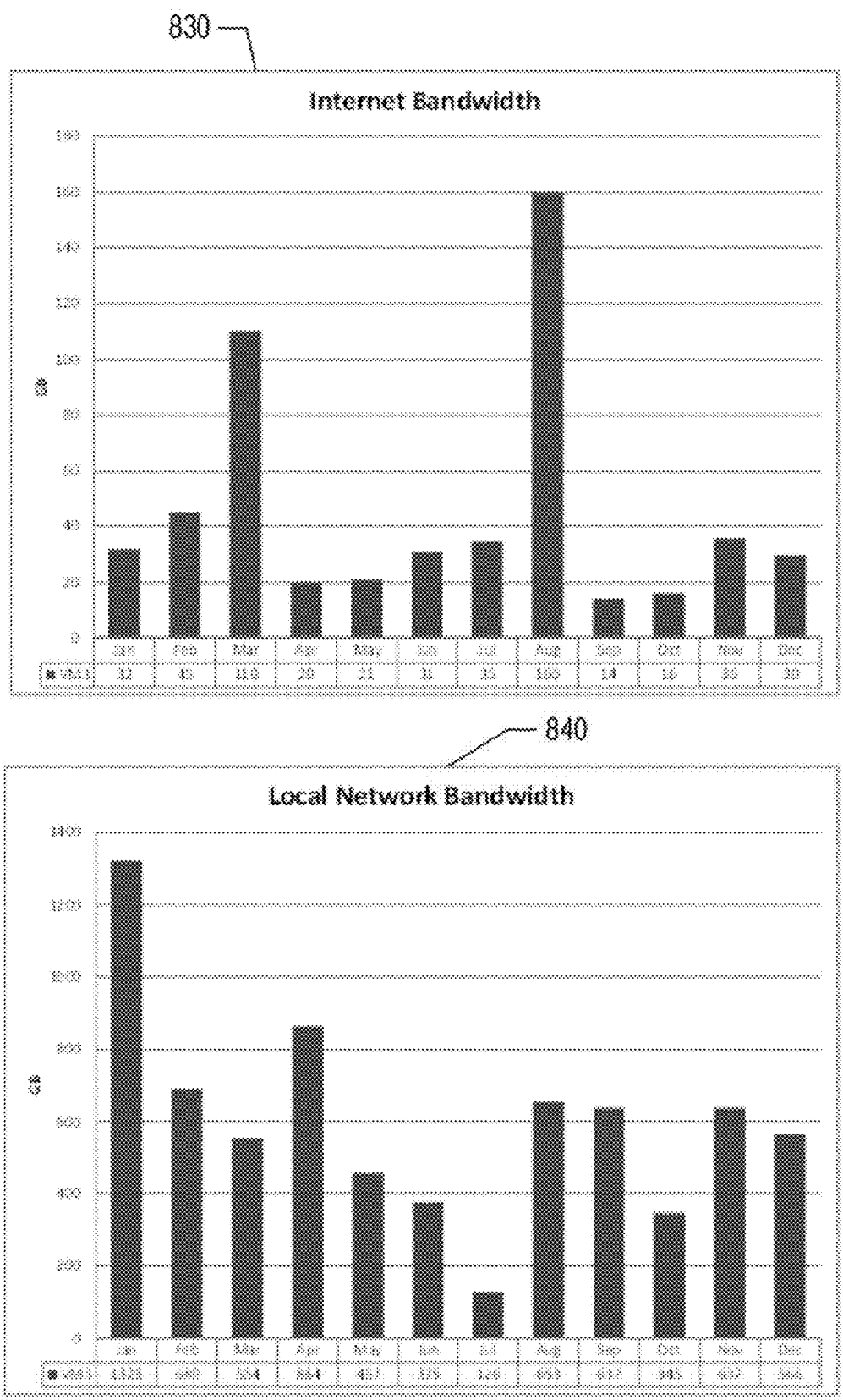

The example computational loads for third VM 506 are illustrated in FIGS. 8A-C. Five bar charts illustrate the usage of each computational resource associated with third VM 506, on a monthly basis, for a period of one year. Chart 800 in FIG. 8A illustrates the use of processing capacity or CPU. Chart 810 in FIG. 8B illustrates the use of memory resources. The memory resource demands of third VM 506 include a minimum memory reservation. The effect of the memory reservation is illustrated on chart 810 as a region 812 representing unutilized memory when the amount of memory used is less than the amount of memory reserved. Since the amount of memory used in each month is less than the reserved amount of memory, memory load on the host computer system is a constant 6 GB. For example, in September the third VM 506 uses 4 GB of memory, but 6 GB is reserved. Memory demands on the host computer system 500 are 6 GB and 2 GB of memory, illustrated by the region 812 on chart 810, is reserved but unused. Chart 820 in FIG. 8B shows the use of persistent storage capacity. The storage demands of third VM 506 includes a minimum storage reservation of 150 GB. As a result, some storage space beyond what is used is reserved as illustrated by the region 822 in chart 820. The total storage space provided by the host computer system 500 is a constant 150 GB per month, even though the client VM does not use the storage resources provided. Chart 830 in FIG. 8C illustrates Internet usage, and the final chart 840 in FIG. 8C, illustrates local area network use.

Host computer system 500 acts as a host for the three VMs 502, 504, and 506. The VM's computational loads illustrated in FIGS. 6A-C, 7A-C, and 8A-C are aggregated to a load that is hosted by host computer system 500. The resulting aggregate computational load is illustrated in FIGS. 9-13, for each resource category, along with the configured headroom for each resource, and the amount of remaining unused resources on the host computer system 500.

Figure 9:
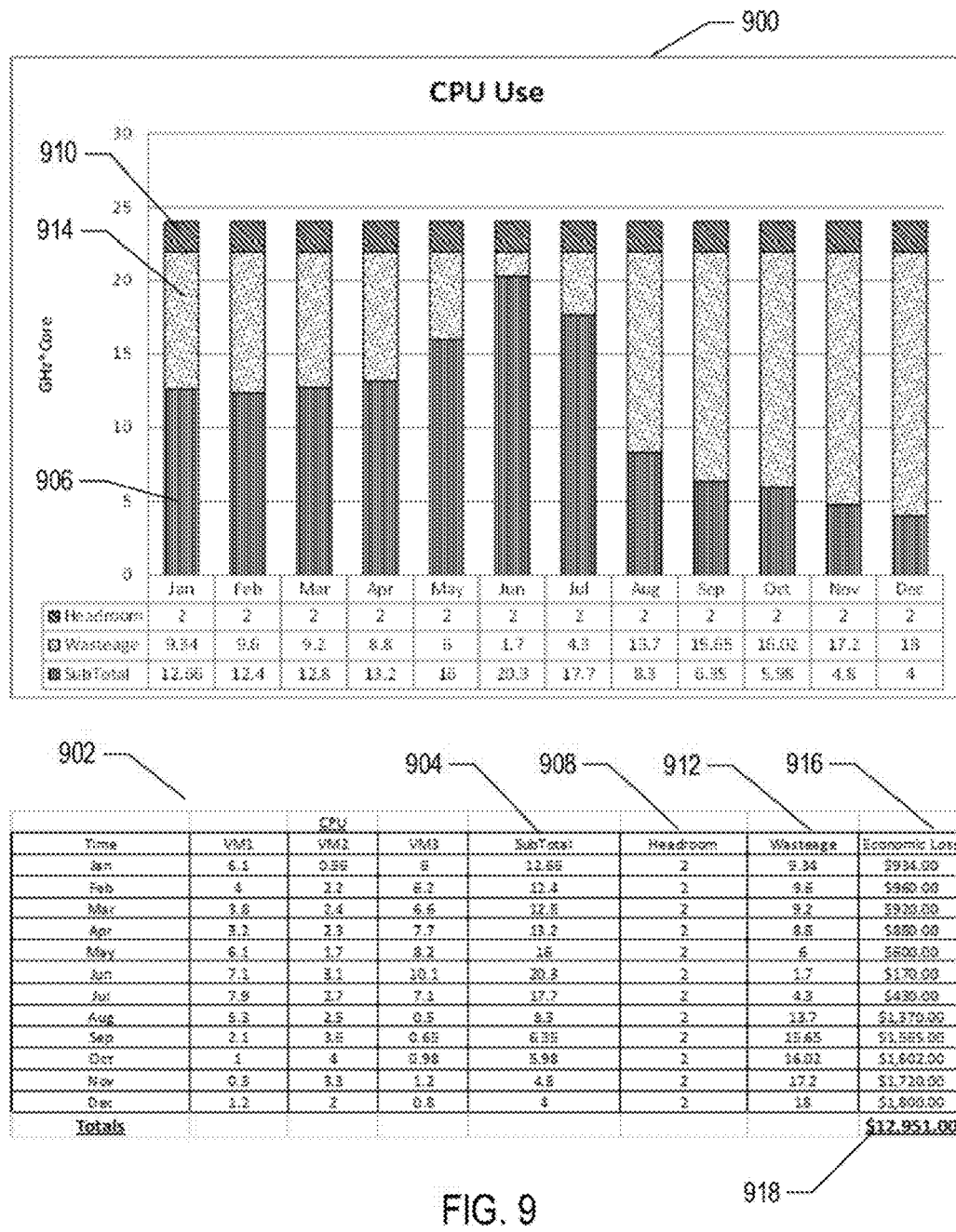
FIG. 9 illustrates utilization of processing resources over time by the host computer system while the host computer system is hosting the first, second, and third virtual machines.

FIG. 9 illustrates the utilization of processing resources over time by the host computer system 500 while the host computer system is hosting the first, second, and third VMs 502, 504, and 506. The processor utilization is presented in the form of a CPU-use chart 900 as well as an associated CPU-use data table 902. A CPU-use subtotal column 904 is computed by taking the sum of the CPU use of the three VMs, and is represented by a CPU subtotal element 906 in the CPU-use chart 900. A CPU-headroom column 908 is based on the host computer system parameters presented in FIG. 5, and is represented by a CPU headroom element 910 in the CPU-use chart 900. A CPU-wastage column 912 is computed as the total CPU resource installed on the host computer system 500, minus the CPU-use subtotal 904, minus the CPU headroom 908. The total CPU resource in this example is 24 Ghz as shown in FIG. 5. A CPU-wastage element 914 is shown in the CPU-use chart 900. Using the per unit CPU cost information provided for the host computer system 500 provided in FIG. 5 and the CPU-wastage data in the CPU-use chart 900, economic loss attributable to wastage of processing resources is calculated by multiplying the per unit CPU cost by the CPU-wastage data in the CPU-wastage column 912. The resulting economic loss attributable to CPU-wastage is shown in a CPU-economic-loss column 916. A total annual cost of processing resource wastage 918 is also provided.

In one implementation, determining the cost of resource wastage is accomplished using the following pseudocode routine.

```
1   ///////////////////////////////////////////////////////////////
    ///
2   //
3   // Compute the cost of wastage
4   //
5   // Inputs:
6   // installedResource - amount of resource installed on the host
7   // headroom - amount of resource reserved for computational bursts
8   // totalCost - total cost of installed resources
9   // usedResources - amount of resources used
10  //
11  // Returns:
12  // cost of wastage
13  //
14  ///////////////////////////////////////////////////////////////
    ///
15  float CalcWastageCost(float installedResource, float headroom,
        float totalCost, float usedResources)
16  {
17  // Calculate the cost of each available resource unit.
18  float availableResourceCost = totalCost / (installedResource-
        headroom);
19  // Calculate amount of wasted resources
20  float wastage = installedResource-headroom-usedResources;
21  if(wastage < 0) wastage =0;
22  // Determine cost of wastage and return
23  return (wastage * availableResourceCost)
24  }
```

In alternative implementations, or for some computational resource categories, headroom is specified as a percentage of installed resources. The following pseudocode routine determines the cost of resource wastage when the headroom is defined as a percentage of the installed computational resources.

```
1   ///////////////////////////////////////////////////////////////
    ///
2   //
3   // Compute the cost of wastage
4   //
5   // Inputs:
6   // installedResource - amount of resource installed on the host
7   // headroom - amount of resource reserved for non-client uses, as a
        percentage of
8   // the amount of installed resources. (0-1.0)
9   // totalCost - total cost of installed resources
10  // usedResources - amount of resources used
11  //
12  // Returns:
13  // cost of wastage
14  //
15  ///////////////////////////////////////////////////////////////
    ///
16  float CalcWastageCost(float installedResource, float headroom,
        float totalCost, float usedResources)
17  {
18  // Calculate the cost of each available resource unit.
19  float availableResourceCost = totalCost / (installedResource*
        (1-headroom));
20  // Calculate amount of wasted resources
21  float wastage = installedResource-headroom-usedResources;
22  if(wastage < 0) wastage =0;
```

```
23  // Determine cost of wastage and return
24  return (wastage * availableResourceCost)
25  }
```

From the perspective of the host computer system, reservations of processing capacity by VMs, application programs, or other computational loads do not cause wastage so long as resulting unused processing resources are reallocatable by the resource manager to other computational loads. This is the case with products, such as virtual machine monitors, that implement a soft reservation scheme when managing processing resources. In a soft reservation scheme, when actual processing resource usage is less than the amount of reserved processing capacity, unused processing resources are reallocated to other processes until the unused resources are demanded by the process that made the reservation. In systems that implement a hard reservation scheme, a reservation of processing capacity would increase wastage when the actual processing use was less than the amount of the reservation, because reserved resources would not be reassigned and put to useful work.

Figure 10:
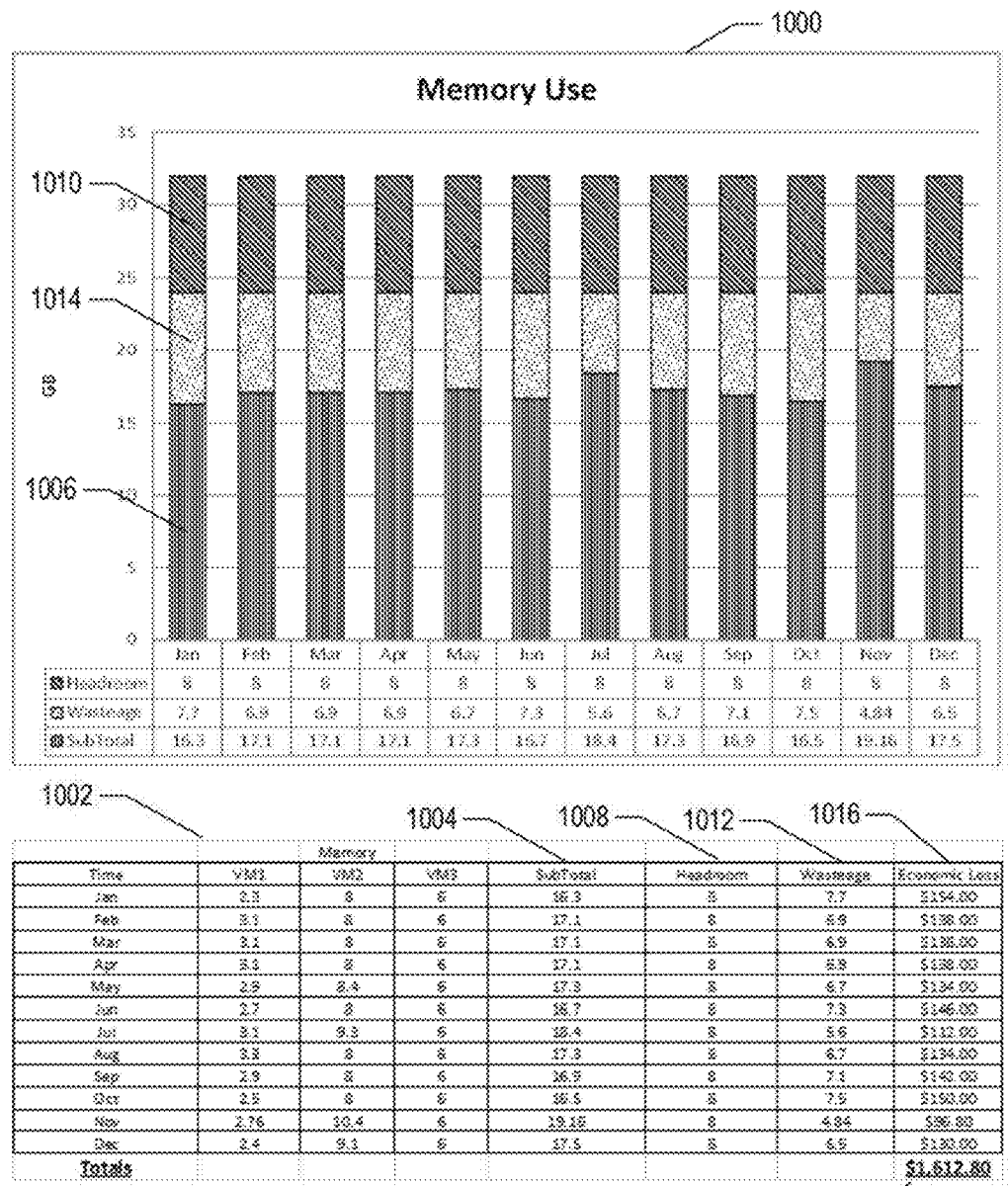
FIG. 10 illustrates utilization of memory resources over time by the host computer system while hosting the first, second, and third virtual machines.

FIG. 10 illustrates the utilization of memory resources over time by the computer system while hosting the VMs 502, 504, and 506. The memory utilization is presented in the form of a memory-use chart 1000 as well as an associated memory-use data table 1002. A memory-use subtotal column 1004 is computed by taking the sum of the memory use of the three VMs, and is represented by a memory subtotal element 1006 in the memory-use chart 1000. A memory-headroom column 1008 is based on information from the host computer system parameters presented in FIG. 5, and is represented by a memory headroom element 1010 in the memory-use chart 1000. A memory-wastage column 1012 is computed as the total memory resource installed on the host computer system 500, minus the memory-use subtotal 1004, minus the memory headroom 1008. The total memory resource in this example is 32 GB as shown in FIG. 5. A memory-wastage element 1014 is shown in the memory-use chart 1000. Using the per unit memory cost information provided for the host computer system 500 shown in FIG. 5 and the memory-wastage data in the memory-use chart 1000, economic loss attributable to memory resource wastage is calculated by multiplying the per unit memory cost by the memory-wastage data in the memory-wastage column 1012. The economic loss attributable to memory-wastage is shown in a memory-economic-loss column 1016. A total annual cost of memory wastage 1018 is also provided.

In the example illustrated in FIG. 10, there are hard memory reservations configured for the second VM 504 and the third VM 506. The effect of the hard memory reservations is illustrated in memory-use data table 1002. The amount of memory used by the third VM 506 is a constant 6 GB because the actual memory use by the third VM 506 does not exceed the amount of the hard memory reservation. The amount of memory demanded from the host computer system by the second VM 504 sometimes exceeds the 8 gigabyte hard memory reservation that is configured for the second VM 504, but demand does not decrease below the amount of the hard memory reservation. Memory that is in excess of the amount used, but less than the reservation is not considered wastage from the standpoint of the host computer system and, in this example, is not added to the memory-wastage data 1012. However, reserved but unused memory is wastage from the standpoint of the client that owns and configures the VM. The concepts of client-side wastage and host-side wastage are explained in more detail later in this disclosure.

In some implementations, reservations of memory are implemented as soft reservations. One way this is accomplished is to reallocate reserved yet unused memory to other computational loads that can use the memory. A specific method, used by some virtual machine monitors is called ballooning. The ballooning method relies on a ballooning driver installed on the VM. When the ballooning driver senses that there is an excessive amount of unused memory reserved by the VM, the balloon driver performs a memory allocation within the VM's memory space, pins the allocated memory in place so that the memory cannot be paged or swapped, and makes the reserved memory available to the virtual machine monitor for allocation to another VM. In this way, the balloon driver corrects the excess reservation by surrendering the unused resource back to the host resource manager. When soft memory-reservation techniques are used, memory use by the VMs is more efficient and client-side wastage is reduced.

Figure 11:
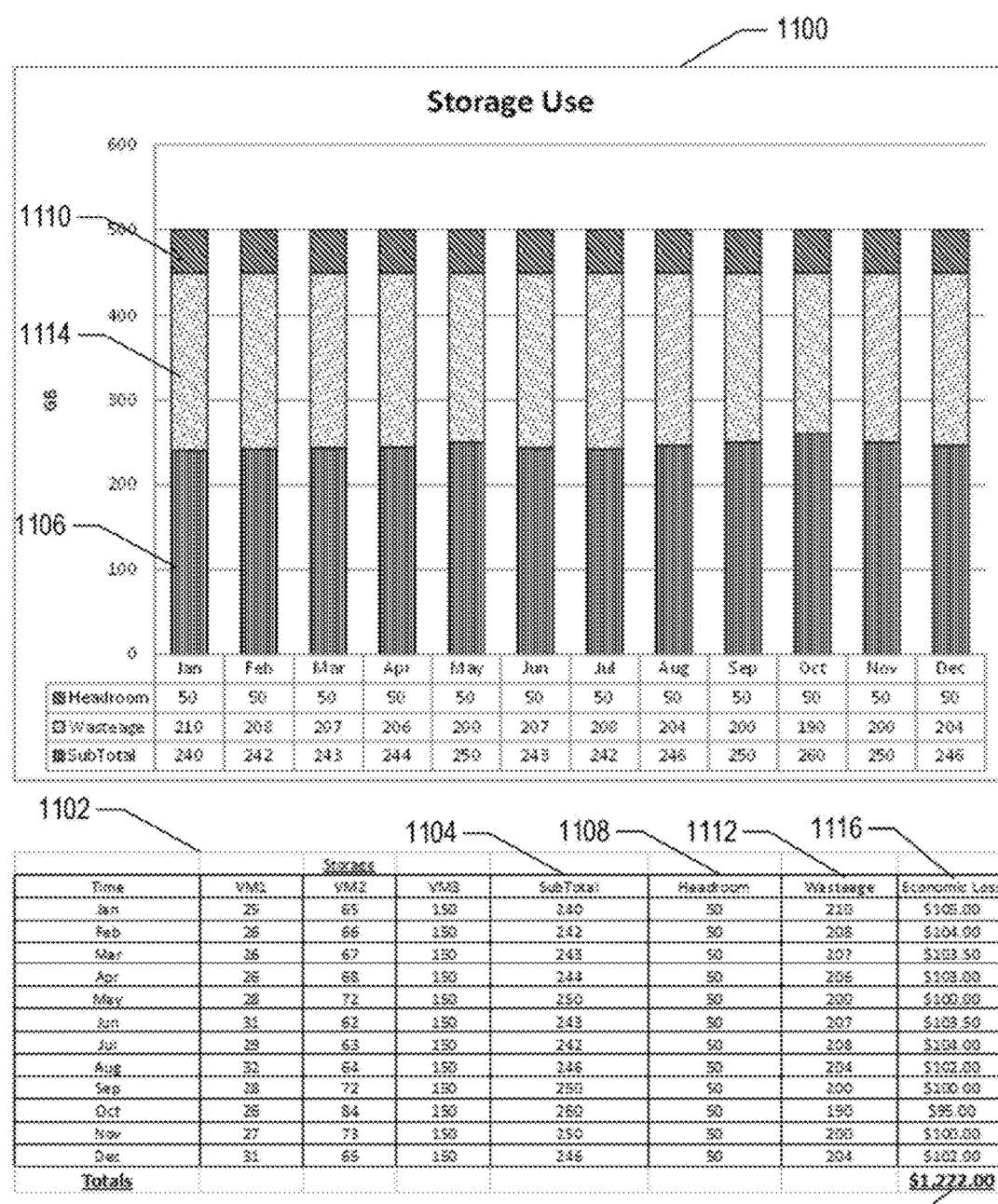
FIG. 11 illustrates utilization of storage resources over time by the host computer system while hosting the first, second, and third virtual machines.

FIG. 11 illustrates the utilization of storage resources over time by the computer system while hosting the first, second, and third VMs. The storage utilization is presented in the form of a storage-use chart 1100 and an associated storage-use data table 1102. A storage-use subtotal column 1104 is computed by taking the sum of the storage use of the three VMs, and is represented by a storage subtotal element 1106 in the storage-use chart 1100. A storage-headroom column 1108 is based on the host computer system parameters presented in FIG. 5, and is represented by a storage headroom element 1110 in the storage-use chart 1100. A storage-wastage column 1112 is based on the total storage resource installed on the host computer system 500, minus the storage-use subtotal 1104, minus the storage headroom 1108. The total storage resource in this example is 500 GB as shown in FIG. 5. A storage-wastage element 1114 is shown in the storage-use chart 1100. Using the per unit storage cost information provided for the host computer system 500 as shown in FIG. 5 and the storage-wastage data in the storage-use chart 1100, economic loss attributable to storage resource wastage is calculated by multiplying the per unit storage cost by the storage-wastage data in the storage-wastage column 1112. The economic loss attributable to storage-wastage is shown in a storage-economic-loss column 1116. A total annual cost of storage wastage 1118 is also provided.

Disk space is allocated to VMs in a variety of ways. In certain implementations, disk space is dynamically allocated from the host computer system as the demands of the VM increase. In other implementations, a fixed amount of storage space is allocated from the host computer system to the VM. Generally, storage space is not reclaimed from the VM once allocated. In FIG. 11, the first and second VMs 502 and 504 use a dynamic disk allocation method. Therefore the amount of host resources consumed correlates to the amount of storage space utilized by the VM. The third VM 506 demands a fixed disk reservation of 150 GB. For the third VM 506, the amount of host resources consumed is constant, even when only a portion of the reserved disk space is used to store information. The method of storage allocation used for the third VM 506 acts as a hard reservation of storage resources for the third VM 506. Excessive hard storage reservations contribute to client-side wastage.

Figure 12:
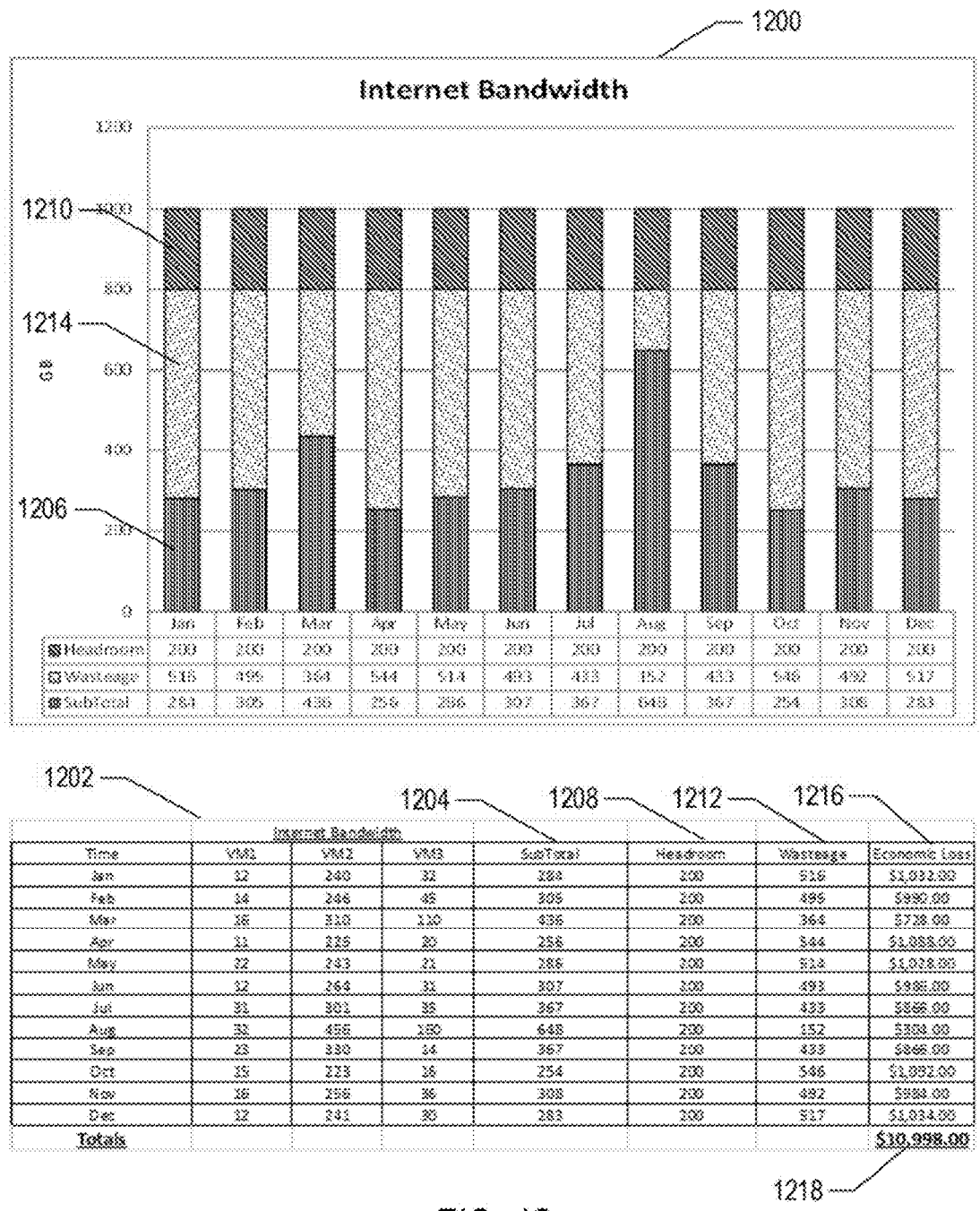
FIG. 12 illustrates utilization of Internet resources over time by the host computer system while hosting the first, second, and third virtual machines.

FIG. 12 illustrates the utilization of Internet resources over time by the computer system while hosting the first, second, and third VMs. The Internet utilization is presented in the form of an Internet-use chart 120X) as well as an associated Internet-use data table 1202. An Internet-use subtotal column 1204 is computed by taking the sum of the Internet use of the three VMs, and is represented by an Internet subtotal element 1206 in the Internet-use chart 1200. An Internet-headroom column 1208 is based on the host computer system parameters presented in FIG. 5, and is represented by an Internet headroom element 1210 in the Internet-use chart 1200. An Internet-wastage column 1212 is computed based on the total Internet resource installed on the host computer system 500, minus the Internet-use subtotal 1204, minus the Internet headroom 1208. The total Internet transfer volume in this example is 1 terabyte per month as shown in FIG. 5. An Internet-wastage element 1214 is shown in the Internet-use chart 1200. Using the per unit Internet cost information for the host computer system 500 provided in FIG. 5, and the Internet-wastage data in the Internet-use chart 1200, economic loss attributable to Internet resource wastage is calculated by multiplying the per unit Internet cost by the Internet-wastage data. The economic loss attributable to Internet-wastage is shown in an Internet-economic-loss column 1216. A total annual cost of Internet resource wastage 1218 is also provided.

Figure 13:
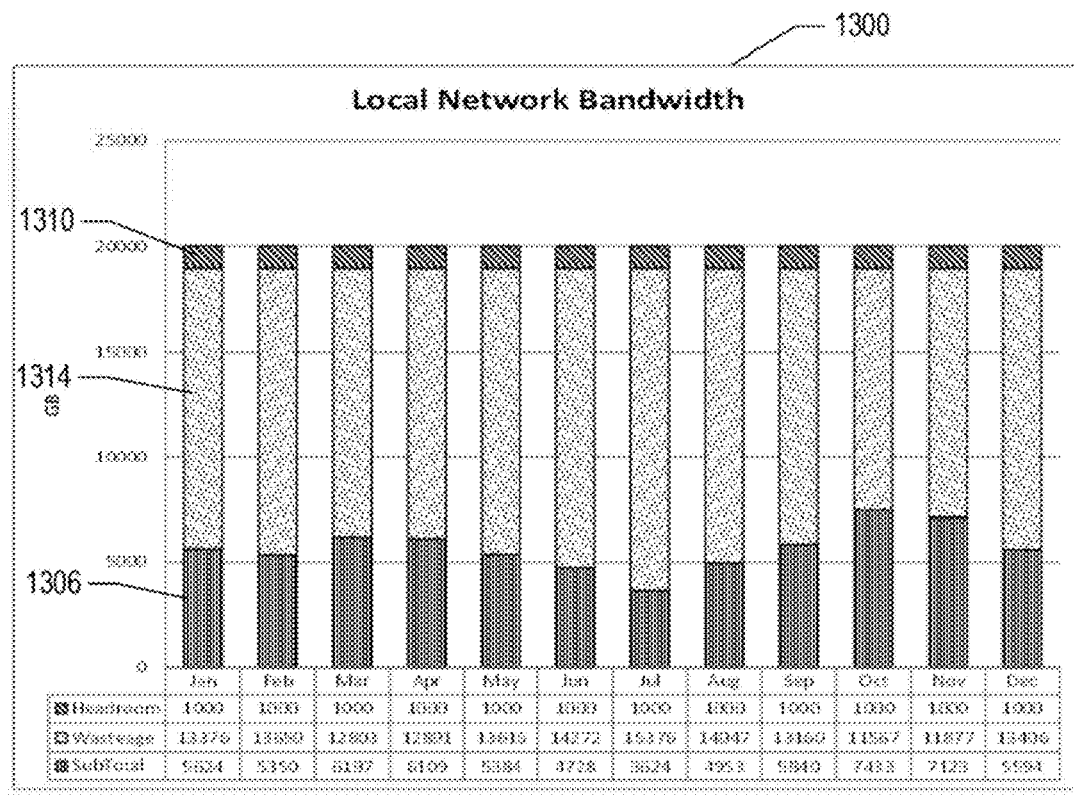
FIG. 13 illustrates utilization of local area network ("LAN") resources over time by the host computer system while hosting the first, second, and third virtual machines.

FIG. 13 illustrates the utilization of LAN resources over time by the computer system while hosting the first, second, and third VMs. The LAN utilization is presented in the form of a LAN-use chart 1300 as well as an associated LAN-use data table 1302. A LAN-use subtotal column 1304 is computed by taking the sum of the LAN use of the three VMs, and is represented by a LAN-subtotal element 1306 in the LAN-use chart 1300. A LAN-headroom column 1308 is based on the host computer system parameters presented in FIG. 5, and is represented by a LAN-headroom element 1310 in the LAN-use chart 1300. A LAN-wastage column 1312 is computed as the total LAN resource installed on the host computer system 500, minus the LAN-use subtotal 1304, minus the LAN headroom 1308. The total LAN data transfer resource in this example is 20 terabytes as shown in FIG. 5. A LAN-wastage element 1314 is shown in the LAN-use chart 1300. Using the per unit LAN bandwidth cost information provided for the host computer system 500 provided in FIG. 5 and the LAN-wastage data in the LAN-use chart 1300, economic loss attributable to LAN resource wastage is calculated by multiplying the per unit LAN cost by the LAN-wastage data. The economic loss attributable to IAN wastage is shown in a LAN-economic-loss column 1316. A total annual cost of LAN resource wastage 1318 is also provided.

Figure 14:
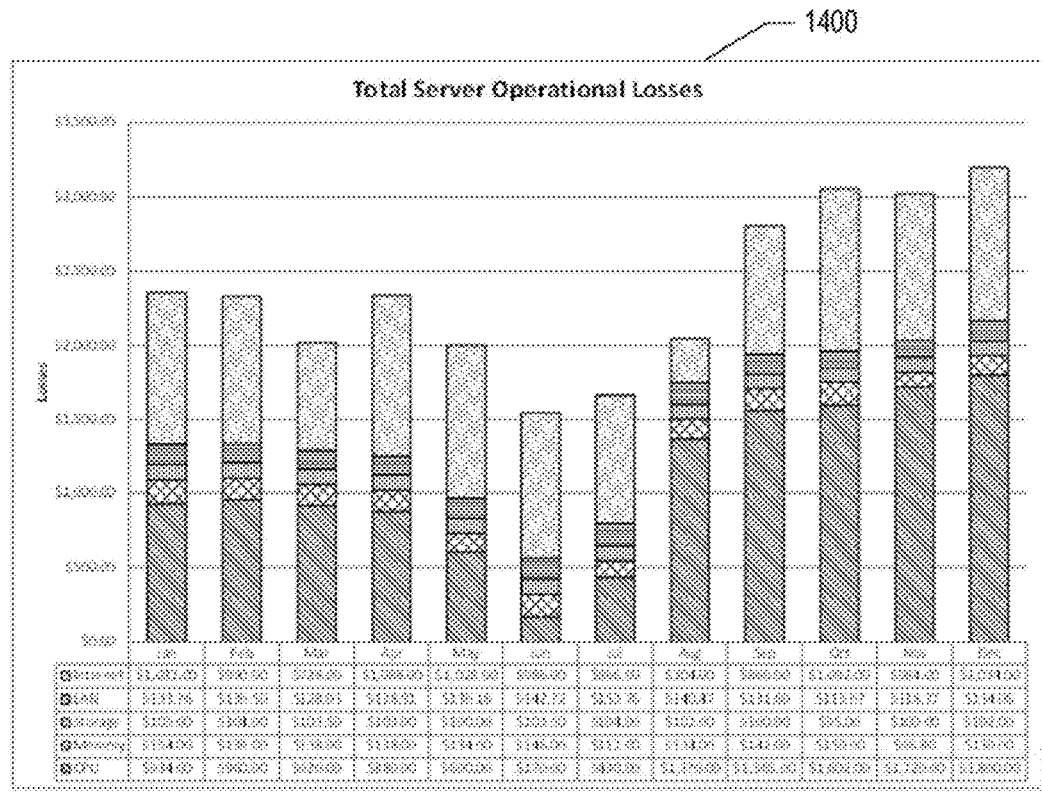
FIG. 14 illustrates cost of computational-resource wastage on the host computer system.

FIG. 14 illustrates the aggregate cost of computational-resource wastage on the host computer system. The table of economic losses 1450 shows the cost of the computational-resource wastage calculated in FIGS. 9-13. Economic losses associated with each computational resource category are summed to determine an economic loss for each monthly accounting period, as well as an annual loss total 1452. The economic-loss chart 1400 presents similar information in a graphical format. FIG. 14 illustrates that the cost of unused computational resources can accumulate to a substantial sum over time. These losses are reduced by using the monitoring and management techniques described in the present disclosure.

Client-Side Utilization, Wastage, and Economic Loss

In many environments, the operation and maintenance of the datacenter is performed by one entity, and the computational loads are owned, managed, and operated by other entities. The previous example of computational-resource wastage describes host-side wastage. Host-side wastage is normally caused and controlled by the entity that provides the computational resources. Host-side wastage is created by an oversupply of available computational resources that exceeds the client's demand for computational resources. Client-side wastage is wastage created by demand for resources in excess of actual use by the client computational load. This usually results from a client making a hard resource reservation that exceeds the client's actual resource use. For example, client-side wastage is generated when a hard reservation of disk storage resources is requested and a small portion of the reserved storage resources used. The unused reserved disk storage cannot be reallocated by the operator/manager of the host computer system, and the resources are wasted.

Figure 15:
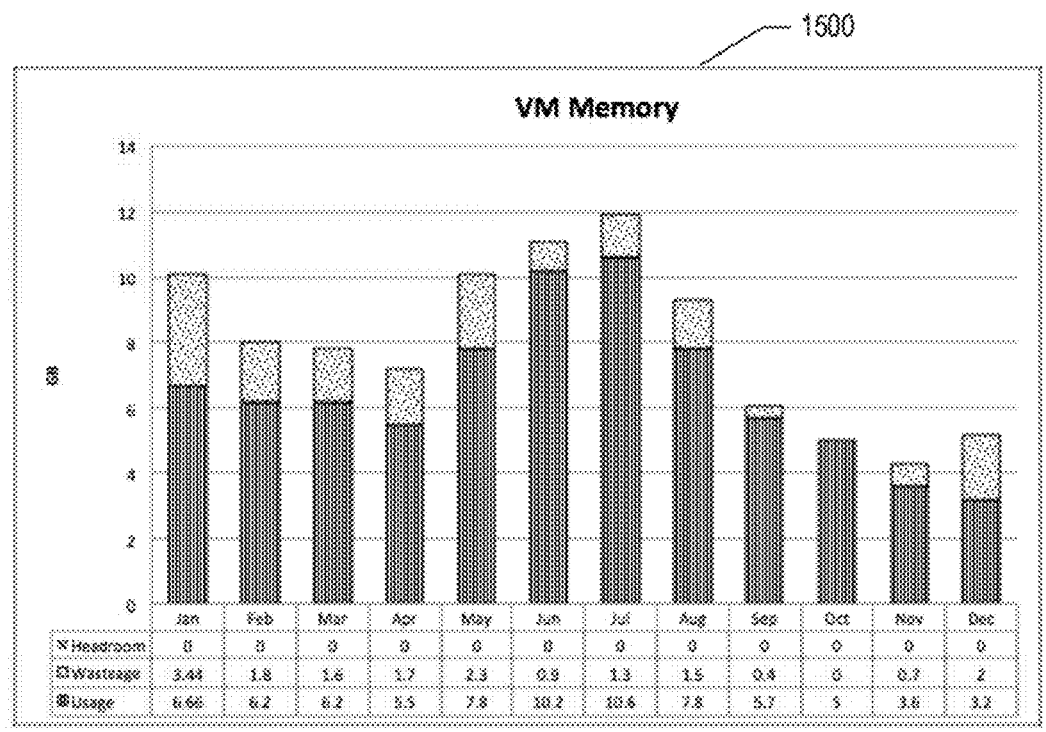
FIG. 15 illustrates an example of memory utilization over time for a pair of virtual machines.

FIG. 15 illustrates an example of memory utilization over time for a pair of VMs. A VM memory use chart 1500 and a VM memory use table 1550 show the memory usage for two VMs VM1 and VM2. VM2 has an associated hard memory reservation of 4 GB. The amount of memory used by VM2 for the 12-month period does not meet or exceed the amount of the reservation, but the amount of memory supplied to VM2 by the host computer system each month is a constant 4 GB per month. There is no headroom configured for the operation of the two VMs VM1 and VM2, and the amount of memory used by VM2 does not exceed the amount of memory reserved, therefore the amount of memory resource wastage by the excessive memory reservation is the difference between the amount of the reservation and the actual memory used by VM2. Since the excessive reservation will cause an increase in memory use on the host computer system, the client can often be billed for the memory resource wastage even though the supplied resources are not put to useful work within the VM. Usually, client-side wastage results in an overpayment by the client, and not a loss to the hosting entity. In the example shown in FIG. 15, the amount of overpayment is calculated by multiplying the client-side wastage by the per unit memory cost from FIG. 5. Naturally, computational resource providers are free to charge more than their cost to clients, and in real-world applications, the price charged generally exceeds the cost of providing the resource.

Figure 16:
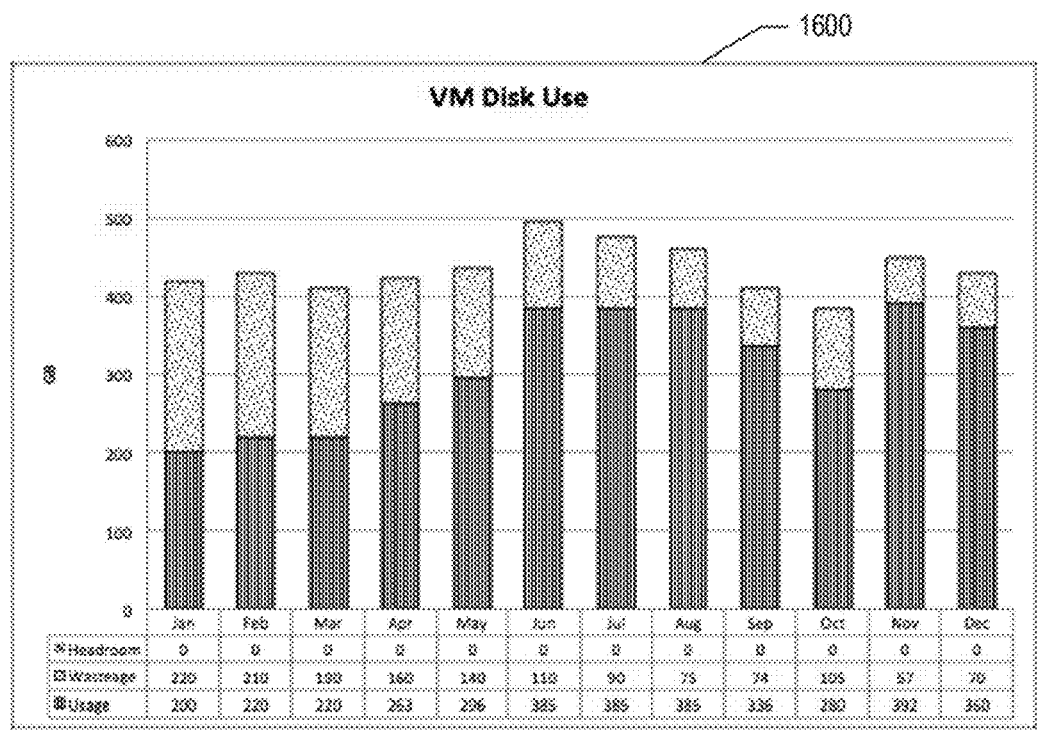
FIG. 16 illustrates an example of storage utilization over time for the pair of virtual machines.

FIG. 16 illustrates an example of storage utilization over time for a pair of VMs. A VM storage use chart 1600 and a VM storage use table 1650 illustrate the use of storage resources for two VMs VM1 and VM2. VM2 has made an associated hard reservation of storage resources in the amount of 300 GB. The amount of storage resources used by VM2 for the 12 month period does not exceed the amount of the reservation, but the amount of disk storage supplied to VM2 by the host computer is 300 GB per month. The amount of client-side wastage of storage resources is the difference between the amount of the reservation and the actual storage use of VM2. In the VM storage use table 1650, the overpayment is calculated by multiplying the wastage by the per unit storage cost.

The following pseudo-code illustrates one way to calculate the client-side load and client-side wastage in a computing system:

```
1  ///////////////////////////////////////////////////
2  // Calculate Client-side Resource use, wastage, and loss
3  ///////////////////////////////////////////////////
4  // Structure for holding computational loads and resource data
   struct ComputeLoad {
5      float processing; //Amount of processing resources
6      float memory; //Amount of memory resources
7      float storage  //Amount of storage resources
8      float LAN; //Amount of LAN resources
9      float Internet; //Amount of Internet resources
10    }
11 //////////////////////////////////////////////////////////////////
12 // Accumultate total computational load and client-side wastage
13 // Inputs:
14 // populated ComputeLoad array clientLoads[ ] with nComputeload elements
15 // populated ComputeLoad array clientResevations[ ] with nComputeload elements
16 // Outputs:
17 // totalLoad and totalLoadWaste
18 //////////////////////////////////////////////////////////////////
19 void CalcClientSideUsage (Computeload[ ] clientLoads,Computeload[ ] clientResevations,int nComputeLoad,Computeload *totalLoad, ComputeLoad *totalWaste)
20 {
21 // Initialize Total Waste return value to zero
22 totalWaste->processing=0;
23 totalWaste->memory=0;
24 totalWaste->storage=0;
25 totalWaste->LAN=0;
26 totalWaste->Internet=0;
27 // Initialize Total Load return value to zero
28 totalLoad->processing=0;
29 totalLoad->memory=0;
30 totalLoad->storage=0;
31 totalLoad->LAN=0;
32 totalLoad->Internet=0;
33 // Iterate all the individual loads to calculate the aggregate load and
34 // client-side wastage of resources.
35 for(int i=0;i<nComputeLoad;i++)
36      {
37      ///////////////////////////////////////////////////////////////
38      // accumulate the total computing usage and wastage for each resource
39      ///////////////////////////////////////////////////////////////
40      // Processing power
41      totalLoad->processing += clientLoads[i].processing;
42
43      // Memory
44      if(clientLoads[i].memory < clientResevations[i].memory)
45          {
46          totalWaste->memory += clientResevations[i].memory -- clientLoads[i].memory;
47          totalLoad->memory += clientResevations[i].memory;
48          }
49      else
50          {
51          totalLoad->memory += clientLoads[i].memory;
52          }
53      // Storage
54      if(clientLoads[i].storage < clientResevations[i].storage)
55          {
56          totalWaste->storage += clientResevations[i].storage -- clientLoads[i].storage;
57          totalLoad->storage += clientResevations[i].storage;
58          }
59      else
60          {
61          totalLoad->storage += clientLoads[i].storage;
62          }
63      // LAN transfer
64      totalLoad->LAN += clientLoads[i].LAN;
65
66      // Internet transfer
67      totalLoad->Internet += clientLoads[i].Internet;
68      } // Calculation of total load and total client-side usage and wastage is complete.
69 return;
70 }
```

The above routine assumes that memory and storage resource reservations are hard reservations. Internet, LAN transfer, and processing resources are not subject to hard reservation and any reservations by a VM can be reallocated to other computational loads if necessary. Soft reservations do not cause wastage since the resources are reallocatable and are not exclusively reserved. Although the above pseudocode generally follows a C++ syntax, the pseudocode is intended to communicate algorithmic ideas to the reader and is not intended to be executable in an actual computing environment without additional refinements.

The determination of computational resource wastage can be adapted based on the availability of resource measurements. For example, an expected resource utilization can substitute for headroom. In this case, the cost of wastage is calculated as follows:

| Wastage category | Cost of wastage | Explanation |
| --- | --- | --- |
| Unused Server CPU | If(U < E) C * (E − U)/E else 0 | U = server CPU utilization<br>E = server expected CPU utilization<br>C = total monthly cost allocated to server CPU<br>If server CPU utilization is below expected, then the ratio of differential amount to the expected is the wastage % of total cost |
| Unused Server Memory | If(U < E) C * (E − U)/E else 0 | U = server RAM utilization<br>E = server expected RAM utilization<br>C = total monthly cost allocated to server RAM<br>If server RAM utilization is below expected, then the ratio of differential amount to the expected is the wastage % of total cost |
| Unused Datastore | If(U < E) C * (E − U)/E else 0 | U = datastore utilization<br>E = expected datastore utilization<br>C = total monthly cost allocated to datastore<br>If datastore utilization is below expected, then the ratio of differential amount to the expected is the wastage % of total cost |

In certain situations, a safety factor is employed to ensure that computational resources are available to handle burst loads. The safety factor is taken into account when calculating resource wastage. Applying a safety factor $\mu$ results in a following calculation of wastage for networking resources:

| Wastage category | Cost of wastage | Explanation |
| --- | --- | --- |
| Internet bandwidth wastage | If(T > μU) C * (T − μU)/T else 0 | C = total monthly cost of internet<br>T = total bandwidth given by provider<br>U = avg bandwidth used in the month<br>μ = safety factor, generally >1 |
| LAN bandwidth wastage | If(T > μU) C * (T − μU)/T else 0 | C = total monthly cost of LAN<br>T = LAN bandwidth<br>U = avg bandwidth utilized in the month<br>μ = safety factor, generally >1 |

The calculation of client-side wastage may be similarly adapted to the available resource measuring capabilities. For example, the following chart illustrates a number of methods for calculating computational resource wastage in the context of a VM:

| Wastage category | Cost of wastage | Explanation |
| --- | --- | --- |
| Unused reservation on VM memory | If(R is defined & R > U) (R − U) * rate else 0 | R = reserved memory in GB<br>U = memory utilization of the VM in GB<br>rate = monthly cost per GB |
| Unused storage in vmdks in thick provisioned disks | If(thick provisioned) (D − U) * rate else 0 | D = thick provisioned disk size<br>U = actual utilization<br>rate = monthly cost per GB |
| Idle VM - CPU | U * rate | U = CPU utilization of the VM in GHz<br>rate = monthly cost per GHz |
| Idle VM - Memory | U * rate | U = Memory utilization of the VM in GB<br>rate = monthly cost per GB |
| Powered off VM - storage | U * rate | U = Storage utilization of the VM in GB<br>rate = monthly cost per GB |

Figure 17:
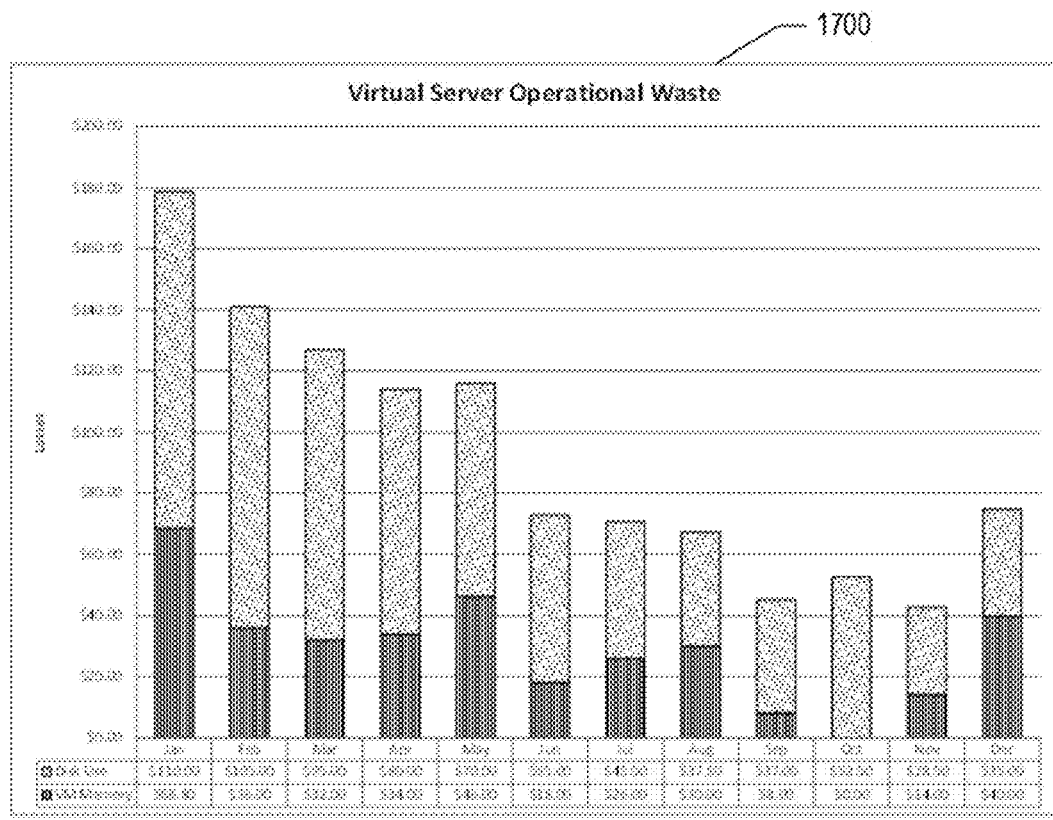
FIG. 17 illustrates accumulation of cost of computational-resource wastage on the pair of virtual machines.

FIG. 17 illustrates the accumulation of the cost of computational resource wastage on the pair of VMs. The virtual server operational wastage chart 1700 displays a graphical representation of the data contained in the virtual-machine-economic-losses table 1750. The amount of overpayment for memory and storage resources are aggregated into a total economic loss column 1752. A total price of computational-resource wastage 1754 is provided. FIG. 17 illustrates how client-side wastage of computational resources accumulates to become a substantial financial burden on the client. Accurate financial measures, like those illustrated in FIGS. 15-17, aid the client in making better decisions regarding the configuration and operation of computational loads.

Economic incentives generally encourage the providers of computational resources to minimize host-side wastage, and consumers of computational resources are incentivised to minimize client-side wastage. The measuring and reporting methods described in the present disclosure help both parties make better decisions when managing computational resources. Overall peak efficiently of resource usage is attained when both host-side and client-side wastage is minimized.

Methods and Systems that Measure and Manage Datacenter Resources

Computational loads are measured by instrumentation that is incorporated into an operating system on the host computer system, and in some cases, a client's virtual-machine operating system. Instrumentation that measures computational load is well known in the art, and facilities that measure computational loads include the Windows™ task manager and the Mac™ activity monitor. Computational loads are measured and recorded periodically. In the examples illustrated in FIGS. 6-17, the computational loads are measured monthly. Other measuring time intervals are suitable. In certain implementations, computational loads are measured each second, each 10 seconds, or each hour. Longer measuring time intervals cover longer time periods with fewer samples. For example, long-term records can be generated by measuring computational loads each day, each week, or over each month or more. In some implementations, different computational resources are measured using different measuring time intervals. For example, in certain implementations, the processor resource usage is measured each second, and the storage resource usage is measured each week. A measuring time interval can be adapted to the speed with which the type of computational resource is reallocated. For example, computational resources, such as processor resources, tend to be reallocated to different computational loads frequently, whereas storage resources tend to be reallocated slowly. Therefore, in particular implementations, processor resources are measured more frequently than storage resources.

Figure 18:
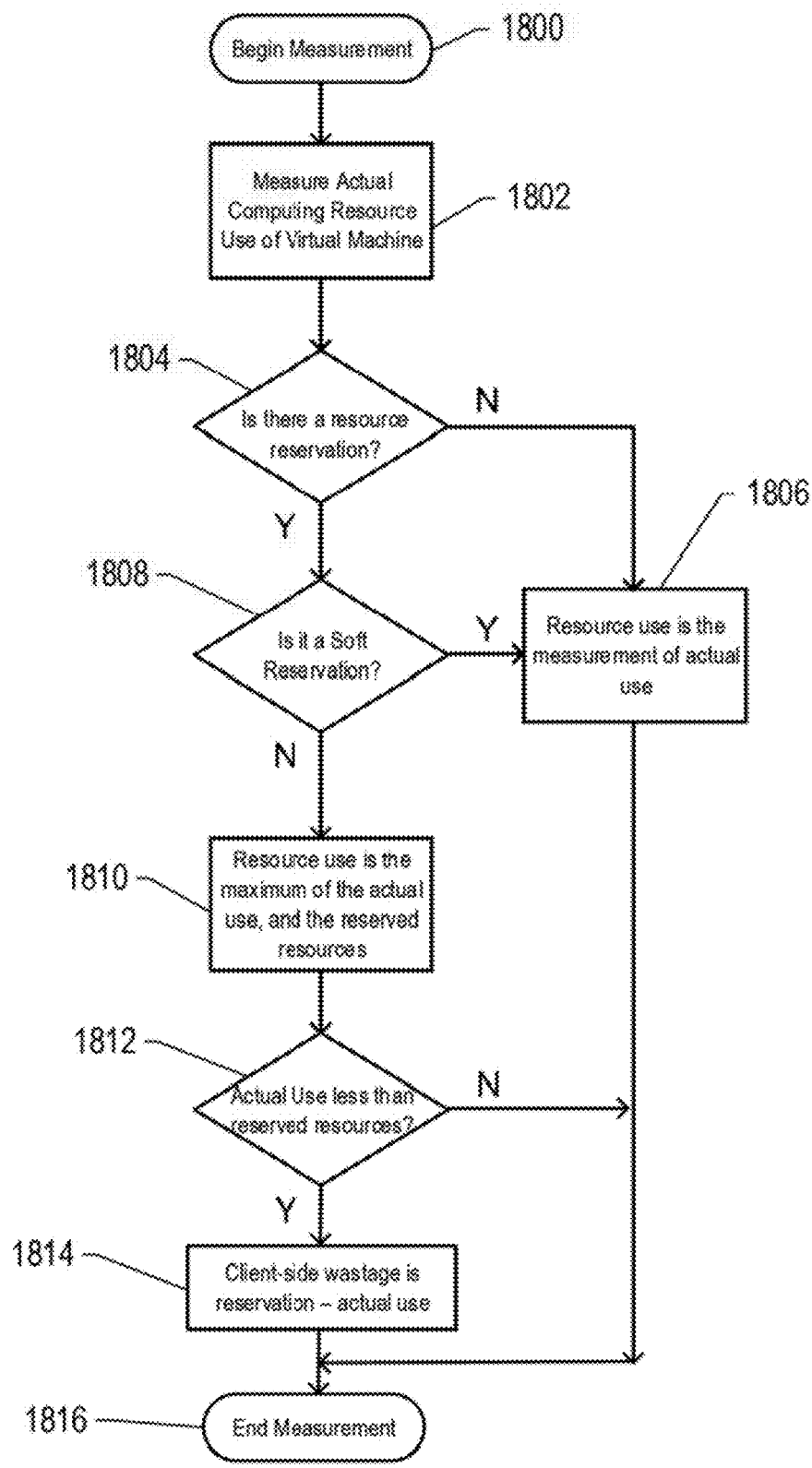
FIG. 18 illustrates a process that measures the usage and wastage of a computational resource of a particular virtual machine.

FIG. 18 illustrates a process that measures the usage and wastage of a computational resource of a particular VM. A periodic signal, such as an interrupt or software timer, triggers execution at the starting point 1800. A measuring block 1802 calls a resource reporting function to determine the amount of computational resources used since the previous resource measurement. Resource reporting functions are present in modern operating systems and the measuring block 1802 may use the available facilities of either the hosted operating system or the host operating system to determine the amount of used computational resources.

A reservation identification block 1804 interrogates the properties of the VM to identify any relevant resource reservations. Examples of resource reservations include thick provisioned disks, CPU core reservations, and memory reservations. When there is not a reservation associated with the measured computational resource, the actual amount of resources used on the host computer system is equal to the amount measured 1806, and there is no client-side wastage of the measured resource for the particular VM.

A reservation categorization block 1808 evaluates whether the reservation is a soft reservation. Resources that are allocated to a VM with a soft reservation can be reallocated to other computational loads. For example, the operation of a Ballooning driver converts a hard memory reservation into a soft reservation by allocating unused reserved memory within a VM and making the reserved memory available to the hosting computer system. If the resource reservation is a soft reservation, the reserved resources do not contribute to wastage, and the actual amount of resources used on the host computer system is the amount measured 1806, even if this amount is less than the amount of the soft resource reservation. If the reservation is a hard reservation, then the actual amount of resources used on the host computer system is the maximum of the amount of the resource reservation, and the amount of resource usage measured 1810. If the amount of the resource reservation is greater than the amount of resource used 1812, then there is client-side wastage is in the amount of the difference between the reservation and the measured use 1814. Once the measurement process is complete 1816, execution is suspended until the signal to perform another measurement operation is received.

Figure 19:
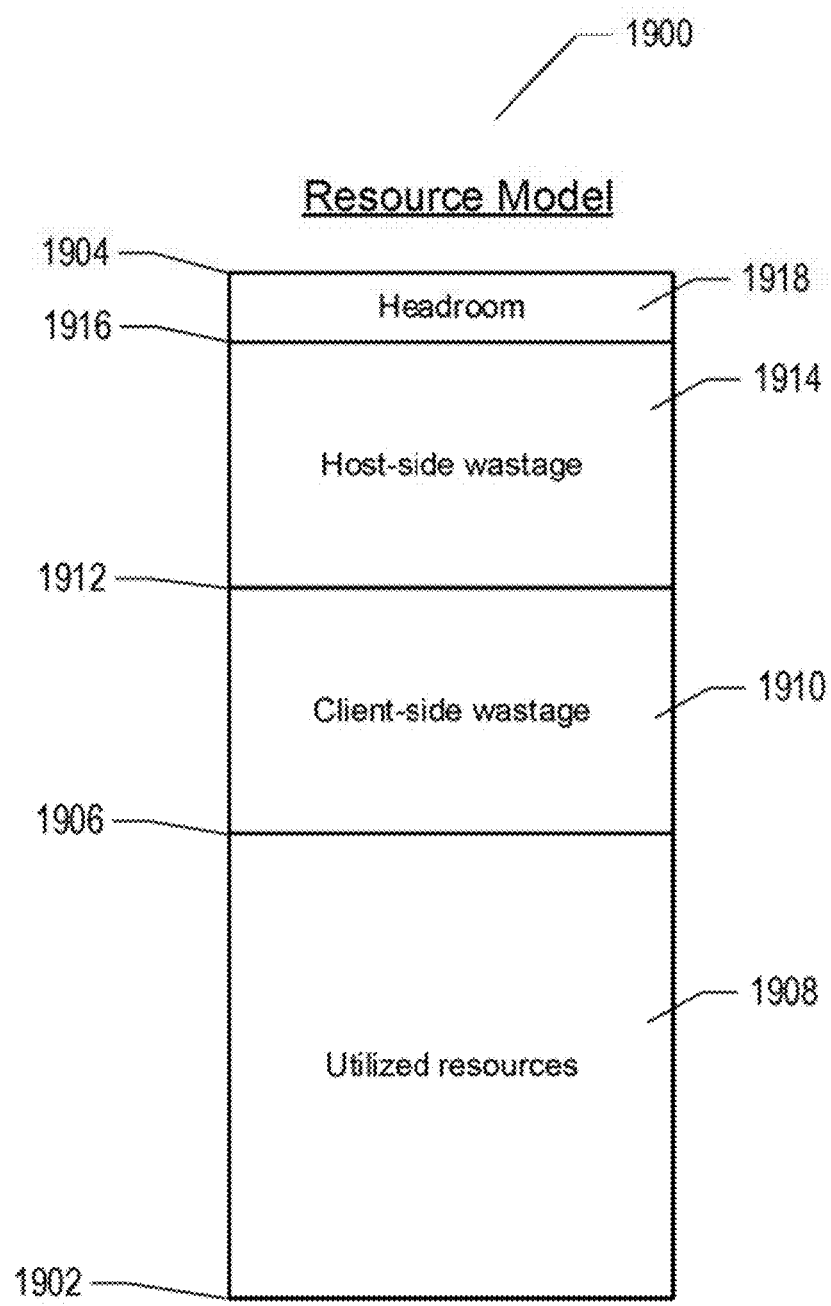
FIG. 19 illustrates a conceptual model of computational resource utilization.

FIG. 19 illustrates a conceptual model of computational resource utilization. An outer rectangular region 1900 represents the total amount of an installed computational resource in a host computer system. For example, outer rectangular region 1900 can represent a total amount of installed memory, or a total amount of installed storage space, on a host server. The vertical dimension of the outer rectangular region 1900 represents increasing amounts of the resource, having an origin 1902 that represents zero resources, and a maximum 1904 that represents the total amount of installed resources on the host computer system. The amount of resources actually used 1906 defines the area that represents the utilized resources 1908. Client-side wastage 1910 is defined by an amount of demanded resources 1912 that exceeds the amount of resources actually used 1906. Host-side wastage 1914 is defined by a total amount of available resources 1916 that exceeds the amount of demanded resources 1912. Headroom 1918, represents the amount of resources reserved for host system operation and for an operational reserve. By measuring and analyzing the utilization of computational resources, informed recommendations can be generated that improve the utilization of computational resources, decrease cost, and improve the performance of hosted computational loads.

Figure 20:
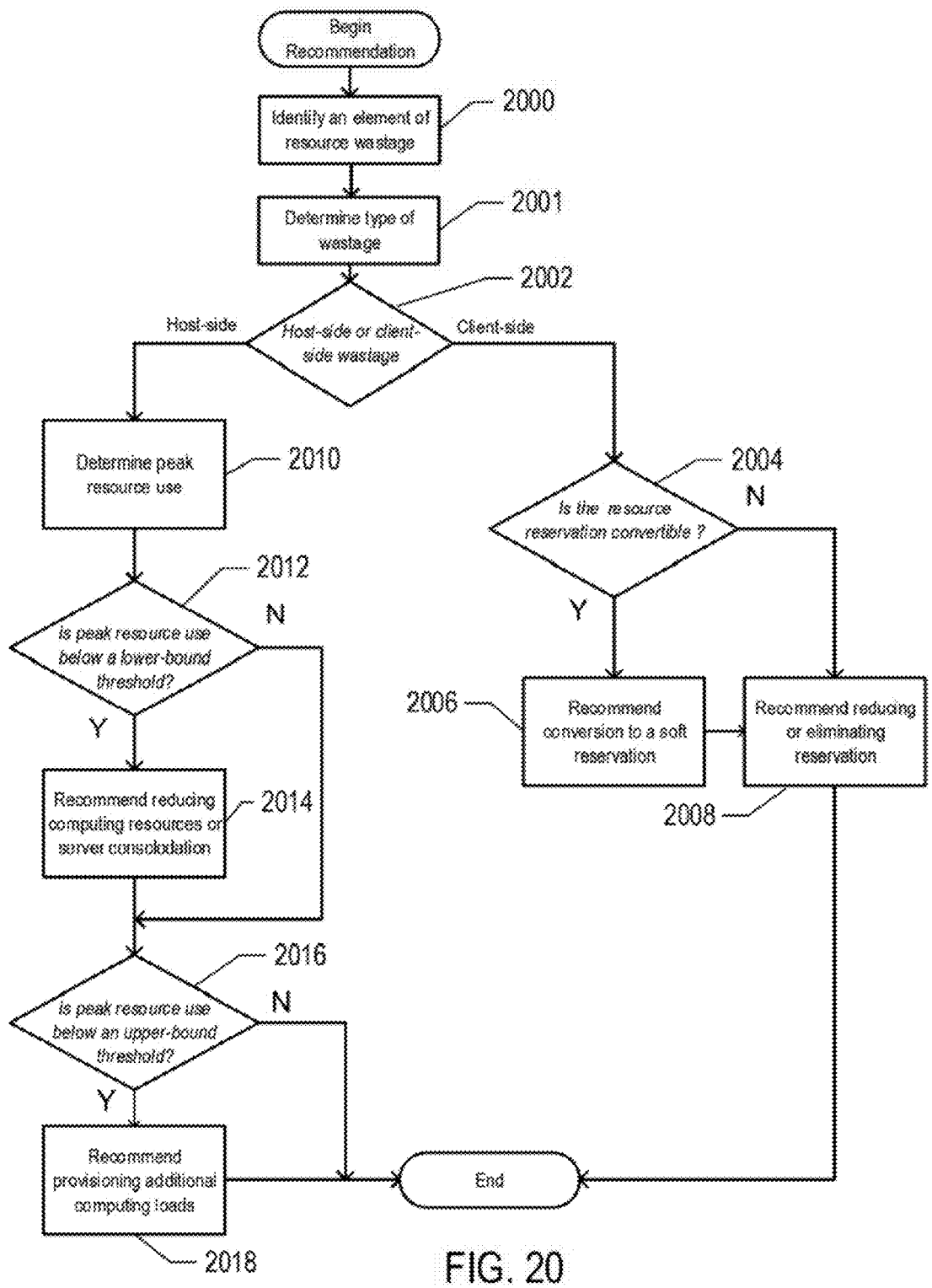
FIG. 20 illustrates a process that generates recommendations for reducing computational-resource wastage.

FIG. 20 illustrates a process that generates recommendations that reduce computational-resource wastage. The process can be implemented on a recommendation engine within a VM management console. The process begins at block 2000 by identifying an element of computational-resource wastage. In many implementations, multiple elements of wastage are added to report a single total-amount of wastage, and each element of the total wastage can have a different cause. In some implementations, the cost of the element of computational-resource wastage is used to identify the element of computational-resource wastage in block 2000. Elements of computational-resource wastage having a larger associated cost present greater opportunities for savings. In some implementations, a recommendation is generated when the associated cost exceeds a threshold value. Two ways of determining the cost associated with an element of computational-resource wastage described above. In categorization block 2001, the type of wastage is identified. For example, when the wastage is caused by a hard resource reservation, the type of wastage is client-side wastage. Otherwise, the type of wastage is host-side wastage. In block 2002, execution takes different paths based on whether the element of wastage is client-side wastage or host-side wastage. If the element of wastage is client-side wastage, execution proceeds to a reservation analysis block 2004. Client-side wastage is associated with a hard resource reservation, and one way to eliminate or reduce the client-side wastage is to convert the hard resource reservation to a soft resource reservation. This can be accomplished in a variety of ways including adding a balloon driver, converting thick provisioned disks to thin provisioned disks, and reconfiguring VM settings associated with the element of wastage. Some hard reservations are not convertible. When the hard resource reservation is convertible to a soft resource reservation, a recommendation is generated to convert the hard resource reservation to a soft resource reservation 2006. Whether or not the reservation is convertible, a recommendation is generated to reduce or eliminate the hard resource reservation 2008.

When the element of wastage is host-side wastage, the reservation engine determines a peak resource utilization 2010. In certain implementations, the peak utilization is determined by identifying a maximum percentage of used computational resources, measured periodically, over a plurality of past time periods. If the peak resource utilization is less than a lower-threshold value 2012, then a recommendation is generated. The recommendation advises that the amount of resources on a host computer system be reduced, or that computational loads from multiple host computer systems should be consolidated 2014. Consolidation involves the decommissioning of at least one host computer system, and moving the computational loads from the decommissioned host computer system to the remaining computer systems. In this way, unused resources are consolidated in a manner that frees an entire host computer system. Individual resources can be removed from a host computer system by removing or replacing memory modules, processing units, and storage devices. LAN service can be downgraded or redundant connections removed. If the lower-threshold value is chosen to be 50% resource utilization, server consolidation will be feasible with 2 host computer systems. In addition, as a practical matter, many computational resources can only be removed from a host computer in quantum amounts. For example, in some computer systems memory can only be installed in increments of two, such as 2 GB, 4 GB, 8 GB, and so on. If memory in such a system were to be removed, the amount of memory would be reduced by 50% or more. A lower-threshold value of less than 50% helps resource removal be technically feasible.

If the peak resource utilization is less than an upper-threshold value 2016, then a recommendation is generated to provision additional computational loads for the host computer system 2018. In certain implementations, this recommendation is issued in addition to the above recommendation 2014. The upper-threshold value is chosen to represent the highest amount of resource utilization that is low enough to accommodate additional computational loads. For example, a value of 75% resource utilization for the upper-threshold value would permit a headroom of 10% of installed resources, and leave 15% of total resources available for additional computational loads. If the peak resource utilization is greater than both the upper and lower threshold value then the peak resource utilization is sufficiently high to preclude either of the above recommendations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for reporting utilization of a host computer system comprising:
    determining an amount of wastage associated with a computational resource based on a measured utilization of the computational resource over a time period; and
    determining whether the wastage is client-side wastage or host-side wastage;
    when the wastage is client-side wastage, identifying a resource reservation associated with the wastage, and recommending that the resource reservation be modified; and
    when the wastage is host-side wastage, determining a maximum utilization of the resource associated with the wastage over a plurality of past time periods, when the maximum utilization of the resource is less than a threshold, recommending that an amount of the computational resource be reduced, and when the maximum utilization of the resource is not less than the threshold, recommending that additional computational loads be hosted on the host computer system.

2. The method of claim 1 wherein the threshold represents less than 50 percent of the installed resources of the host computer system.

3. The method of claim 1 wherein the recommendation that the resource reservation be modified includes a recommendation that the resource reservation be converted to a soft reservation.

4. The method of claim 1 wherein identifying the resource reservation associated with the wastage excludes resource reservations that permit the associated computational resources to be reallocated when the reserved resources are not in use.

5. The method of claim 1 wherein the one or more computational resources comprises at least one resource selected from
    processing resources,
    memory resources,
    storage resources,
    local area network transfer resources,
    Internet transfer resources, and
    disk input/output resources.

6. The method of claim 1 further comprising:
    computing a total cost based on a number of periodic cost; and
    reporting the total cost of resource wastage on the host computer system over a reporting period.

7. The method of claim 1 wherein determining the amount of wastage includes:
    determining an amount of client-side wastage caused by hard resource reservations;
    determining an amount of host-side wastage; and
    summing the amount of client-side wastage and the amount of host-side wastage to generate an amount of total wastage.

8. Non-transitory computer-readable media having instructions encoded thereon that when executed on a computer system perform the operations of:
    measuring the utilization of the one or more available computational resources on the host computer system over a time period;
    determining an amount of wastage for the one or more computational resources over the time period;
    determining whether the wastage is client-side wastage or host-side wastage;
    when the wastage is client-side wastage, identifying a resource reservation associated with the wastage, and recommending that the resource reservation be modified; and
    when the wastage is host-side wastage, determining a maximum utilization of the resource associated with the wastage over a plurality of past time periods, when the maximum utilization of the resource is less than a threshold, recommending that the amount of the computational resource be reduced, and when the maximum utilization of the resource is not less than the threshold, recommending that additional computational loads be hosted on the host computer system.

9. The computer-readable media of claim 8 wherein identifying the resource reservation associated with the wastage excludes resource reservations that permit the associated computational resources to be reallocated when the reserved resources are not in use.

10. The computer-readable media of claim 8 further comprising:
    reporting a total cost of resources wastage on the host computer system over a reporting period.

11. The computer-readable media of claim 8 wherein determining the amount of wastage includes:
    determining an amount of client-side wastage caused by hard resource reservations;
    determining an amount of host-side wastage; and
    adding the amount of client-side wastage to the amount of host-side wastage.

12. A system for managing computational resources comprising:
    one or more processors;
    one or more data-storage devices; and a routine stored in the one or more data-storage devices that when executed by the one or more processors controls the system to carry out
recording utilization of at least one computational resource in the one or more data-storage devices,
determining an amount of resource wastage of the at least one computational resource,
determining whether the wastage is client-side wastage or host-side wastage,
when the wastage is client-side wastage, identifying a resource reservation associated with the wastage, and recommending that the resource reservation be modified, and
when the wastage is host-side wastage, determining a maximum utilization of the resource associated with the wastage over a plurality of past time periods, when the maximum utilization of the resource is less than a threshold, recommending that the amount of the computational resource be reduced, and when the maximum utilization of the resource is not less than the threshold, recommending that additional computational loads be hosted on the host computer system.

13. The system of claim 12 wherein the routine further includes:
generating resource-management recommendations based on the recorded utilization of the at least one computational resource.

14. The system of claim 13 wherein generating the resource-management recommendations includes identifying a computational-resource reservation that contributes to an amount of client-side wastage and recommending that the computational resource reservation be modified to reduce the amount of client-side wastage.

15. The system of claim 13 wherein generating the resource-management recommendations includes determining a peak resource utilization, and when the peak resource utilization is less than a lower threshold, generating a recommendation for reducing an amount of computational resources of a host computer system.

16. The system of claim 15 wherein when the peak resource utilization is less than an upper threshold, generating a recommendation for adding computational loads to the host computer system.

* * * * *